US011422270B2

(12) United States Patent
Teigland et al.

(10) Patent No.: US 11,422,270 B2
(45) Date of Patent: Aug. 23, 2022

(54) GNSS MOBILE BASE STATION AND DATA COLLECTOR WITH ELECTRONIC LEVELING AND HANDS-FREE DATA COLLECTION

(71) Applicant: Carlson Software, Inc., Maysville, KY (US)

(72) Inventors: Halvard Beruit Teigland, Tromso (NO); Jesus Latova, Maysville, KY (US); William C. Herter, Gastonia, NC (US)

(73) Assignee: Carlson Software, Inc., Maysville, KY (US)

( * ) Notice: Subject to any disclaimer, the term of this patent is extended or adjusted under 35 U.S.C. 154(b) by 511 days.

(21) Appl. No.: 16/418,043

(22) Filed: May 21, 2019

(65) Prior Publication Data

US 2019/0271784 A1 Sep. 5, 2019

Related U.S. Application Data

(63) Continuation-in-part of application No. 16/129,106, filed on Sep. 12, 2018, now Pat. No. 10,871,572,
(Continued)

(51) Int. Cl.
*G01S 19/42* (2010.01)
*G01S 19/40* (2010.01)
(Continued)

(52) U.S. Cl.
CPC .............. *G01S 19/42* (2013.01); *G01S 19/07* (2013.01); *G01S 19/235* (2013.01); *G01S 19/40* (2013.01); *G01S 19/43* (2013.01); *G06F 3/04845* (2013.01)

(58) Field of Classification Search
CPC ........ G01S 19/07; G01S 19/235; G01S 19/43; G06F 3/04845; G01C 9/06
See application file for complete search history.

(56) References Cited

U.S. PATENT DOCUMENTS 5,502,898 A 4/1996 Manore
5,512,905 A 4/1996 Nichols et al.
(Continued)

OTHER PUBLICATIONS

TechGEO; Zenith 2 (receptor); The Smallest GNSS; <URL:http://site.techgeo.com.br/produtos/zenite2/>; retrieved on Mar. 5, 2014 from TechGeo Ltda; p. 1/1.
(Continued)

*Primary Examiner* — Bernarr E Gregory
*Assistant Examiner* — Fred H Mull
(74) *Attorney, Agent, or Firm* — Davis, Malm & D'Agostine, P.C.; Richard L. Sampson

(57) ABSTRACT

A GNSS data collection system includes a pole mounted GNSS receiver and inclination sensors. A data collection module provides a data collection graphical user interface (GUI) visible on a hand-held data collector computer. The data collector computer is communicably coupled to the GNSS receiver and receives three-dimensional location data and inclination data for the range pole in real-time. A virtual level component uses the inclination data to display on the GUI real-time tilt information in the form of a virtual bubble level indicator. The inclination data and height of the range pole are used to calculate and display horizontal distance and direction to level the GNSS receiver, using: incline=sqrt (xtilt*xtilt+ytilt*ytilt) where, xtilt=the inclination data for the range pole along the x axis, ytilt=the inclination data for the range pole along the y axis, and horizontal-distancefromlevel=rh*sin(incline) where, rh=the height of the range pole.

55 Claims, 17 Drawing Sheets

Related U.S. Application Data which is a continuation-in-part of application No. 14/730,900, filed on Jun. 4, 2015, now Pat. No. 10,101,459.

(60) Provisional application No. 62/008,933, filed on Jun. 6, 2014.

(51) Int. Cl.
  *G06F 3/04845* (2022.01)
  *G01S 19/23* (2010.01)
  *G01S 19/07* (2010.01)
  *G01S 19/43* (2010.01)

(56) References Cited

U.S. PATENT DOCUMENTS

| | | | |
|---|---|---|---|
| 5,714,948 A * | 2/1998 | Farmakis | G01S 19/23 340/961 |
| 5,739,785 A | 4/1998 | Mlison et al. | |
| 6,052,083 A | 4/2000 | Wilson | |
| 6,628,308 B1 | 9/2003 | Greenberg et al. | |
| 7,562,458 B1 | 7/2009 | Clark, Jr. et al. | |
| 7,886,450 B1 | 2/2011 | Fiano | |
| 8,120,527 B2 | 2/2012 | Ashjaee et al. | |
| 8,125,376 B1 | 2/2012 | Ashjaee et al. | |
| 8,125,379 B2 | 2/2012 | Allison | |
| 8,872,700 B2 | 10/2014 | Ashjaee et al. | |
| 9,035,826 B2 | 5/2015 | Ashjaee et al. | |
| 9,109,889 B2 | 8/2015 | Soubra et al. | |
| 9,134,127 B2 | 9/2015 | Soubra et al. | |
| 9,513,120 B2 | 12/2016 | Briggs et al. | |
| 9,562,764 B2 | 2/2017 | France | |
| 9,689,990 B2 | 6/2017 | Fortune | |
| 2005/0001763 A1 * | 1/2005 | Han | G01S 19/44 342/357.31 |
| 2012/0256788 A1 * | 10/2012 | Ashjaee | G01S 19/43 342/357.23 |
| 2012/0330601 A1 | 12/2012 | Soubra et al. | |
| 2013/0044566 A1 | 2/2013 | Kimura et al. | |
| 2014/0081570 A1 | 3/2014 | Ashjaee et al. | |
| 2014/0184442 A1 | 7/2014 | Large et al. | |
| 2015/0185330 A1 * | 7/2015 | Leandro | G01S 19/35 342/357.63 |
| 2016/0018530 A1 * | 1/2016 | Ashjaee | G01S 19/43 342/357.27 |

OTHER PUBLICATIONS

X.PAD for Android Brochure by GeoMax AG part of HEXAGON; www.geomax-positioning.com; pp. 1-8.
"Leica Smartstation total Station with Integrated GPS", pp. 1-8; Leica Geosystems AG; Switzerland; www.leica-geosystems.com.
Kohanbash, David: "Position Tracking: Total Station"; robotsfor-roboticists.com (blog post); Jun. 13, 2014; pp. 1-5.

* cited by examiner

Fig. 18 – RTK Engine 1 running on CPU 1 (SP80)
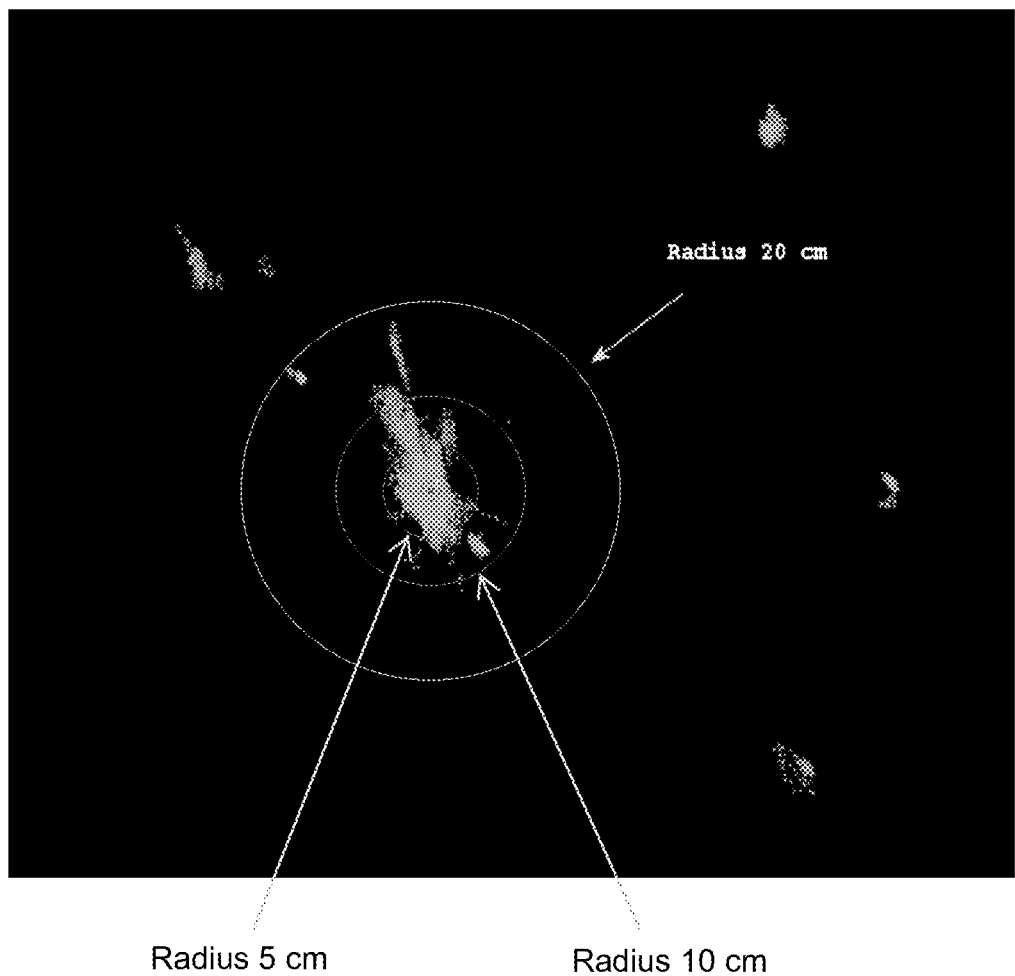

Fig. 19 - RTK Engine 2 running on CPU 2 (BRx6-A)
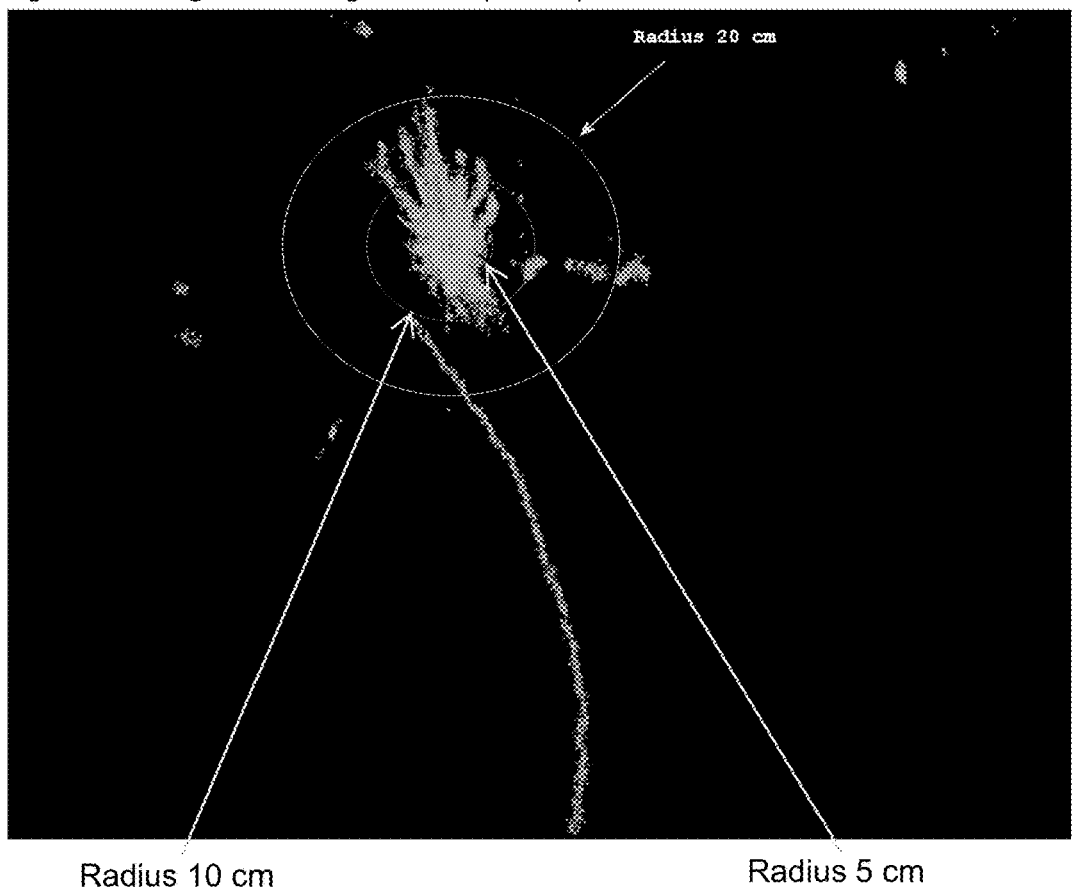
Fig. 20 - RTK Engine 3 running on CPU 3 (BRx6-B)
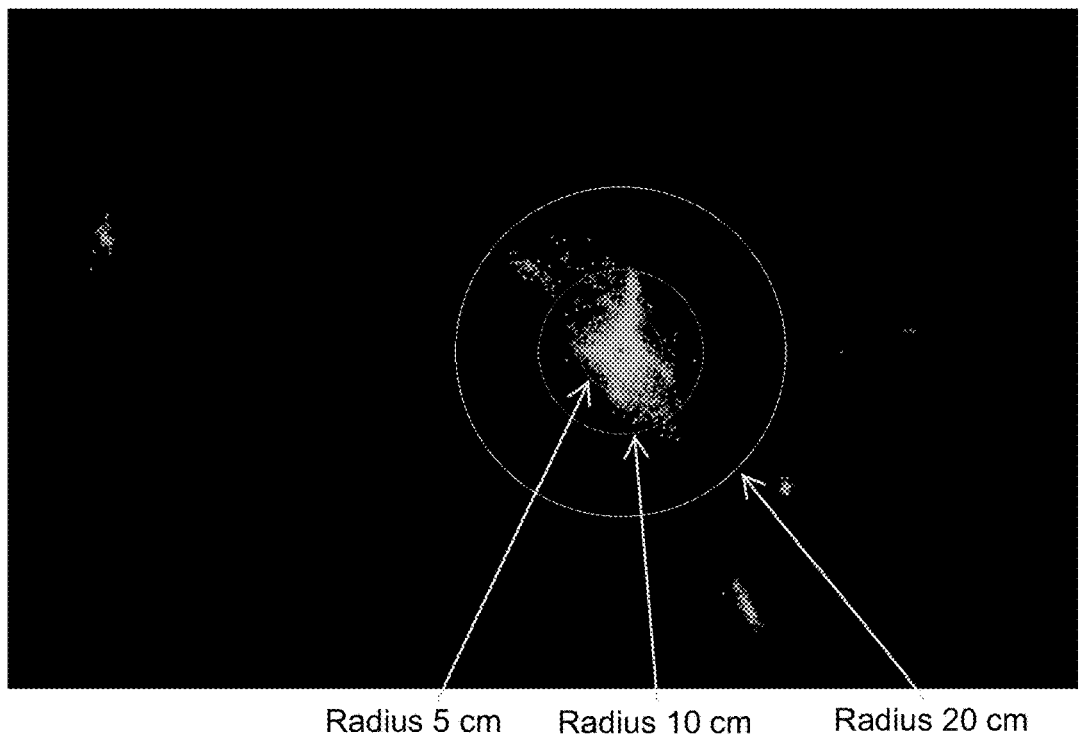

Fig. 21 - RTK Engines 1 and 2 (BRx6-A, SP 80)
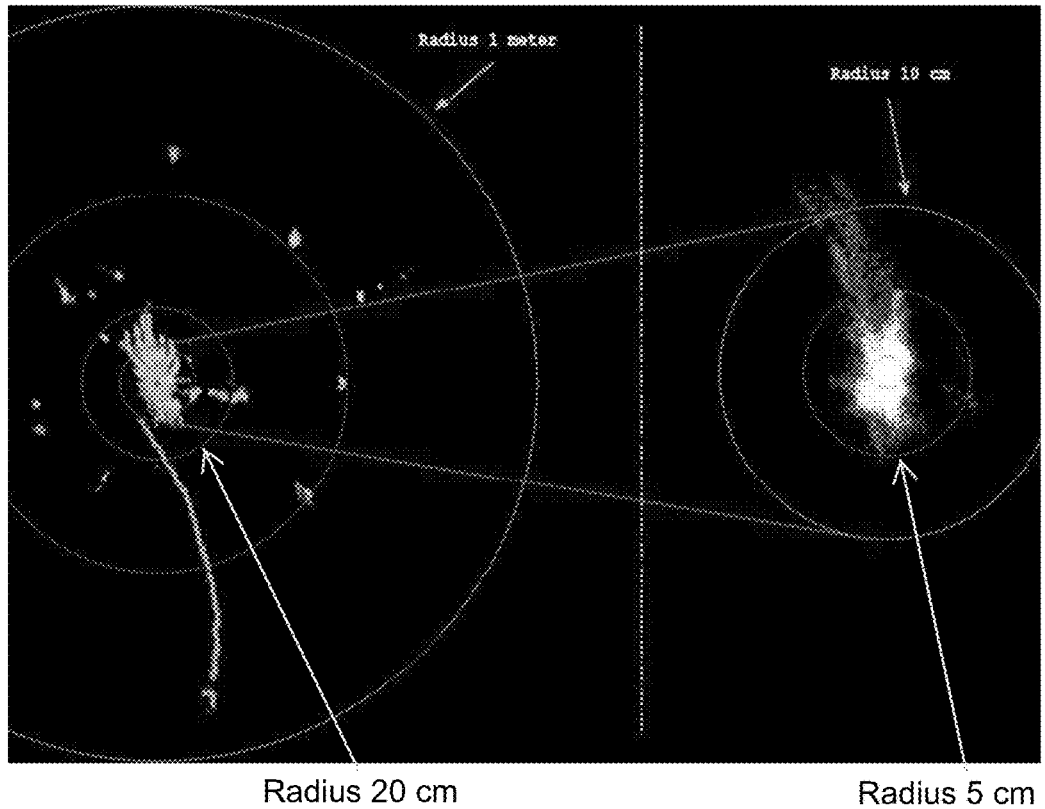
Radius 20 cm                    Radius 5 cm
Fig. 22 - RTK Engines 1, 2 and 3 (BRx6-A, BRx6-B, SP 80)
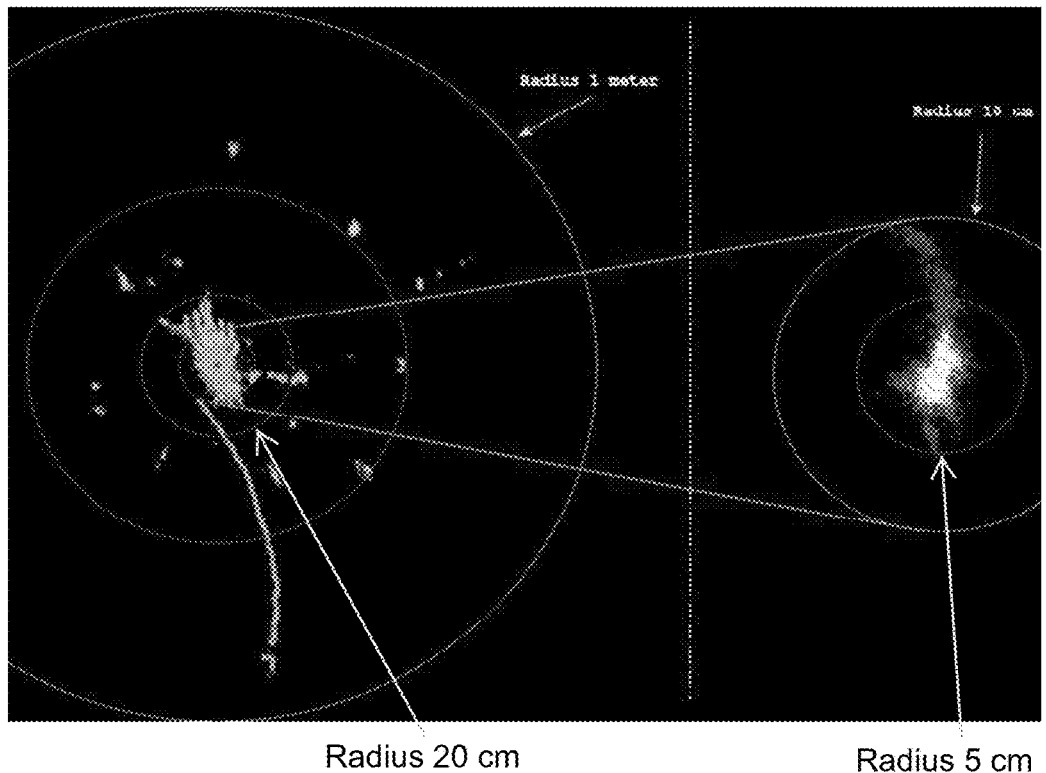
Radius 20 cm                    Radius 5 cm

GNSS MOBILE BASE STATION AND DATA COLLECTOR WITH ELECTRONIC LEVELING AND HANDS-FREE DATA COLLECTION

RELATED APPLICATION

This application claims priority and is a Continuation-In-Part of U.S. patent application Ser. No. 16/129,106, entitled GNSS Mobile Base Station and Data Collector with Electronic Leveling, filed Sep. 13, 2018, which is a Continuation-In-Part of U.S. patent application Ser. No. 14/730,900 (now U.S. Pat. No. 10,101,459), entitled GNSS Mobile Base Station and Data Collector with Electronic Leveling, filed on Jun. 4, 2015, which claims the benefit of U.S. Provisional Patent Application Ser. No. 62/008,933, entitled GNSS Mobile Base Station and Data Collector with Electronic Leveling, filed on Jun. 6, 2014, the contents all of which are incorporated herein by reference in their entirety for all purposes.

BACKGROUND

Technical Field

This invention relates to GNSS surveying, and more particularly to a mobile base station and data collector with electronic leveling to facilitate automated data capture.

BACKGROUND INFORMATION

The USGS (U.S. Geological Survey) Global Navigation Satellite System (GNSS) is a system of satellites that provide autonomous geo-spatial positioning with global coverage. It allows small electronic receivers to determine their location (longitude, latitude, and altitude) to high precision using time signals transmitted along a line of sight by radio from satellites. GNSS is commonly used for various navigation and surveying functions.

Differential grade GNSS equipment differ from commercial grade GPS units by incorporating higher quality antennas and implementing differential corrections that greatly improve the accuracy of the location determination. Differential grade GNSS equipment incorporating high quality antennas can receive information from a greater number of satellites at once, some can receive information from the satellites in several frequencies (L1 and L2), and some can receive information from satellites in different satellite systems (primarily GPS and GLONASS). Differential grade antennas receive corrections from either a satellite based augmentation system (SBAS) or ground based augmentation systems (GBAS). The accuracy of the SBAS and the GBAS corrections depends on the type of system being used and the user's location in relationship to the system's coverage. In addition, differential grade units typically have higher quality mapping software designed to map features using points, lines, and polygons.

As mentioned, a significant aspect of differential-grade GNSS systems is their ability to apply differential corrections to positions. There are several different ways to apply these corrections. One method is to post-process the data after it is collected with data from a nearby base station, however, real-time corrections, e.g., using an RTK (Real Time Kinetic) base station, are more commonly used. The types of real-time corrections that can be used depend upon the particular device being used.

Accuracy of differential-grade GNSS units varies depending upon the type of differential correction applied and the quality of the GNSS receiver and antenna (type, quality, and the number of satellite and frequencies that can be received), with external antennas typically providing the best results.
Survey Grade GNSS Equipment Survey-grade GNSS receivers typically record the full-wavelength carrier phase and signal strength of the L1 and L2 frequencies and track at least eight satellites simultaneously on parallel channels. The antennas used for GNSS survey applications should have stable phase centers and be designed to minimize multipath interference. Survey grade GNSS equipment also include fixed-height, accurately leveled tripods 10 and roving range poles 12, e.g., for RTK procedures, such as shown in FIG. 1.
Real-Time Kinematic (RTK) Procedures Kinematic is a term applied to GPS surveying methods where receivers are in continuous motion, although for relative positioning the more typical arrangement is a stop and go technique. As shown in FIG. 1, this approach involves using at least one stationary reference receiver/tripod 10 and at least one moving receiver called a rover or roving range pole/receiver 12. RTK procedures do not require post-processing of the data to obtain a position solution. Rather, a radio at the reference receiver 10 broadcasts the position of the reference position to the roving receivers 12. This allows for real-time surveying in the field and allows the surveyor to check the quality of the measurements without having to process the data. It is noted that conventional approaches require both the reference receiver/tripod 10 and the roving pole 12 to be properly leveled during data capture in order to provide desired accuracy. This leveling is conventionally provided by the use of conventional bubble levels mounted on the poles of devices 10, 12. This conventional leveling approach generally suffices for the tripod 10 due to its stationary use. However, this approach tends to be cumbersome for the rover 12, because it generally requires the user to stop, observe the bubble level on the pole in order to move the pole to proper vertical orientation, and then hold the pole in position while looking away from the pole to a data collector to capture the data. This leveling process is repeated at each data collection location throughout the work site.

A need exists for an improved system and method to facilitate leveling of RTK rovers and related GNSS equipment and/or to otherwise improve RTK data collection.

SUMMARY

In one aspect of the invention, a GNSS data collection system includes a pole mounted GNSS receiver configured to generate three-dimensional location data. A plurality of inclination sensors disposed in operative engagement with the GNSS receiver, are configured to generate inclination data for the range pole along mutually orthogonal x and y axes. A hand-held data collector computer includes a data collection module configured to generate a data collection graphical user interface (GUI) visible on a display of the collector computer. The data collector computer is communicably coupled to the GNSS receiver and configured to receive the three-dimensional location data and the inclination data for the range pole in real-time. A virtual level component uses the inclination data to display on the GUI real-time tilt information for the range pole in the form of a virtual bubble level indicator. The virtual level component uses the inclination data along with the height (i.e., length) of the range pole to calculate and display a horizontal distance and direction to move the top of the range pole to level the GNSS receiver, wherein the horizontal distance is calculated using the formula:

$$incline = sqrt(xtilt*xtilt + ytilt*ytilt)$$

where, xtilt=the inclination data for the range pole along the x axis, ytilt=the inclination data for the range pole along the y axis, and $$horizontaldistancefromlevel = rh*sin(incline)$$

where, rh=the height of the range pole.

In another aspect of the invention, a method is provided for producing a GNSS data collection system, the method includes providing a pole mounted GNSS receiver for generating three-dimensional location data, including a plurality of inclination sensors configured to generate inclination data for the range pole along mutually orthogonal x and y axes. A hand-held data collector computer includes a data collection module configured to generate a data collection graphical user interface (GUI) visible on a display of the computer. The data collector computer is communicably coupled to the GNSS receiver so that the data collector receives the three-dimensional location data and the inclination data for the range pole in real-time. A virtual level component, implemented by the data collector computer, is configured to use the inclination data to display on the GUI real-time tilt information for the range pole in the form of a virtual bubble level indicator. The virtual level component is configured to use the inclination data along with the height (i.e., length) of the range pole to calculate and display with the GUI, a horizontal distance and direction to move the top of the range pole to level the GNSS receiver, wherein the horizontal distance is calculated using the formula:

$$incline = sqrt(xtilt*xtilt + ytilt*ytilt)$$

where, xtilt=the inclination data for the range pole along the x axis, ytilt=the inclination data for the range pole along the y axis, and $$horizontaldistancefromlevel = rh*sin(incline)$$

where, rh=the height of the range pole.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which:

FIG. 18 is a graphical display of test results for a first RTK engine in demonstration of aspects of embodiments of the claimed invention;

FIG. 19 is a view similar to that of FIG. 18, for a second RTK engine;

FIG. 20 is a view similar to those of FIGS. 18 and 19, for a third RTK engine;

FIG. 21 is a view similar to those of FIGS. 18-29 demonstrating aspects of a two-RTK engine embodiment of the present invention; and FIG. 22 is a view similar to those of FIGS. 18-21 demonstrating aspects of a three-RTK engine embodiment of the present invention.

DETAILED DESCRIPTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

As used in the specification and in the appended claims, the singular forms "a", "an", and "the" include plural referents unless the context clearly indicates otherwise. For example, reference to "an analyzer" includes a plurality of such analyzers. In another example, reference to "an analysis" includes a plurality of such analyses.

Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

Figure 2:
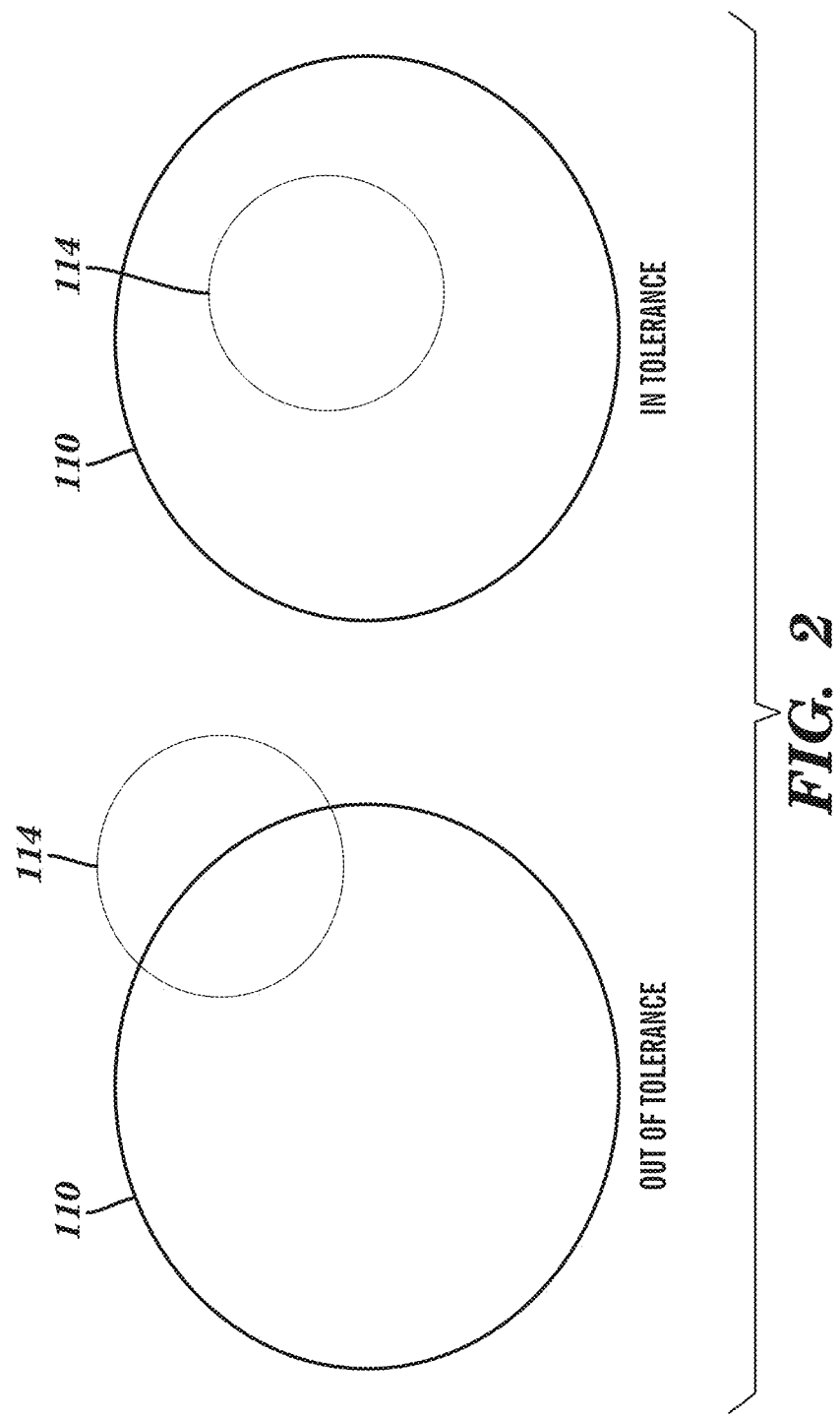
FIG. 2 is a schematic view of a display in accordance with an embodiment of the present invention.
Figure 3:
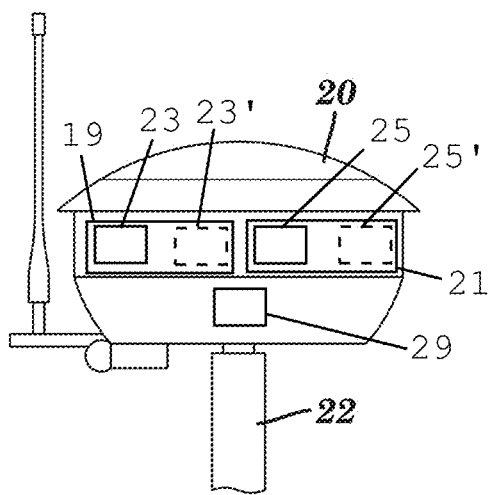
FIG. 3 is a perspective view of elements of an embodiment of the present invention.
Figure 5:
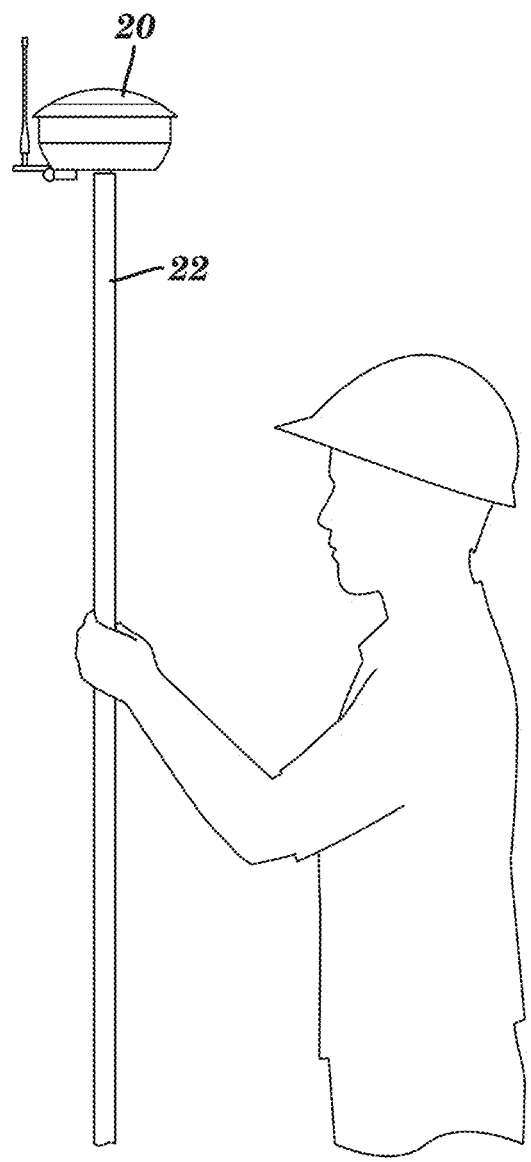
FIG. 5 is a perspective view, on a reduced scale, of the elements of FIG. 3.

Briefly described, embodiments of the present invention include a GNSS rover including a pole mounted GNSS surveying receiver 20 including first and second GNSS receivers 19 and 21 which respectively implement first and second RTK engines 23 and 25, and a hand-held data collector 24, in which the data collector captures and displays real-time tilt information for the GNSS receiver in the form of a virtual bubble level indicator on a Graphical User Interface (GUI) 28 (FIGS. 3&5). As shown in FIG. 2, the GUI 28 displays a tolerance bubble 114 relative to a circle (leveling viewer) 110 corresponding to a target position. The bubble 114 moves in real-time as the range pole 22 (FIGS. 3&5) supporting the GNSS receiver is tilted. If the bubble is "inside" the circle, then the pole is sufficiently oriented (e.g., within tolerance) for desired accuracy, and data collection may commence. In the example shown, the bubble turns green or otherwise indicates proper pole orientation. As also shown, when the bubble is outside the circle, the pole position is out of tolerance, and may be turned red or may otherwise alert the user than data should not be collected until the position of the pole is properly oriented. In particular embodiments, the system is configured to selectively capture and prevent the capture of data depending on the orientation of the pole, e.g., automatically capturing data when the pole is properly oriented, and preventing data capture when the orientation of the pole is out of tolerance. Moreover, as discussed in greater detail hereinbelow, the GUI 28 displays the horizontal distance and direction the pole may be moved to level the GNSS receiver.

In the following description, for purposes of explanation, numerous specific details are set forth in order to provide a thorough understanding of the present invention. It will be evident, however, to one skilled in the art that the present invention may be practiced without these specific details.

As used herein, the terms "computer" and "end-user device" are meant to encompass a workstation, personal computer, personal digital assistant (PDA), wireless telephone, or any other suitable computing device including a processor, a computer readable medium upon which computer readable program code (including instructions and/or data) may be disposed, and a user interface. The term "real-time" refers to sensing and responding to external events nearly simultaneously (e.g., within milliseconds or microseconds) with their occurrence, or without intentional delay, given the processing limitations of the system and the time required to accurately respond to the inputs.

Terms such as "component," or "module", and the like are intended to refer to a computer-related entity, either hardware, a combination of hardware and software, software, or software in execution. For example, a module or component may be, but is not limited to being, a process running on a processor, a processor, an object, an executable, a thread of execution, a program, and a computer. By way of illustration, both an application running on a server and the server (or control related devices) can be modules. One or more modules may reside within a process and/or thread of execution and a module may be localized on one computer and/or distributed between two or more computers or control devices.

Programming Languages

The system and method embodying the present invention can be programmed in any suitable language and technology, such as, but not limited to: C++; Visual Basic; Java; VBScript; Jscript; BCMAscript; DHTM1; XML and CGI. Alternative versions may be developed using other programming languages including, Hypertext Markup Language (HTML), Active ServerPages (ASP) and Javascript. Any suitable database technology can be employed, such as, but not limited to, Microsoft SQL Server or IBM AS 400.

Figure 1:
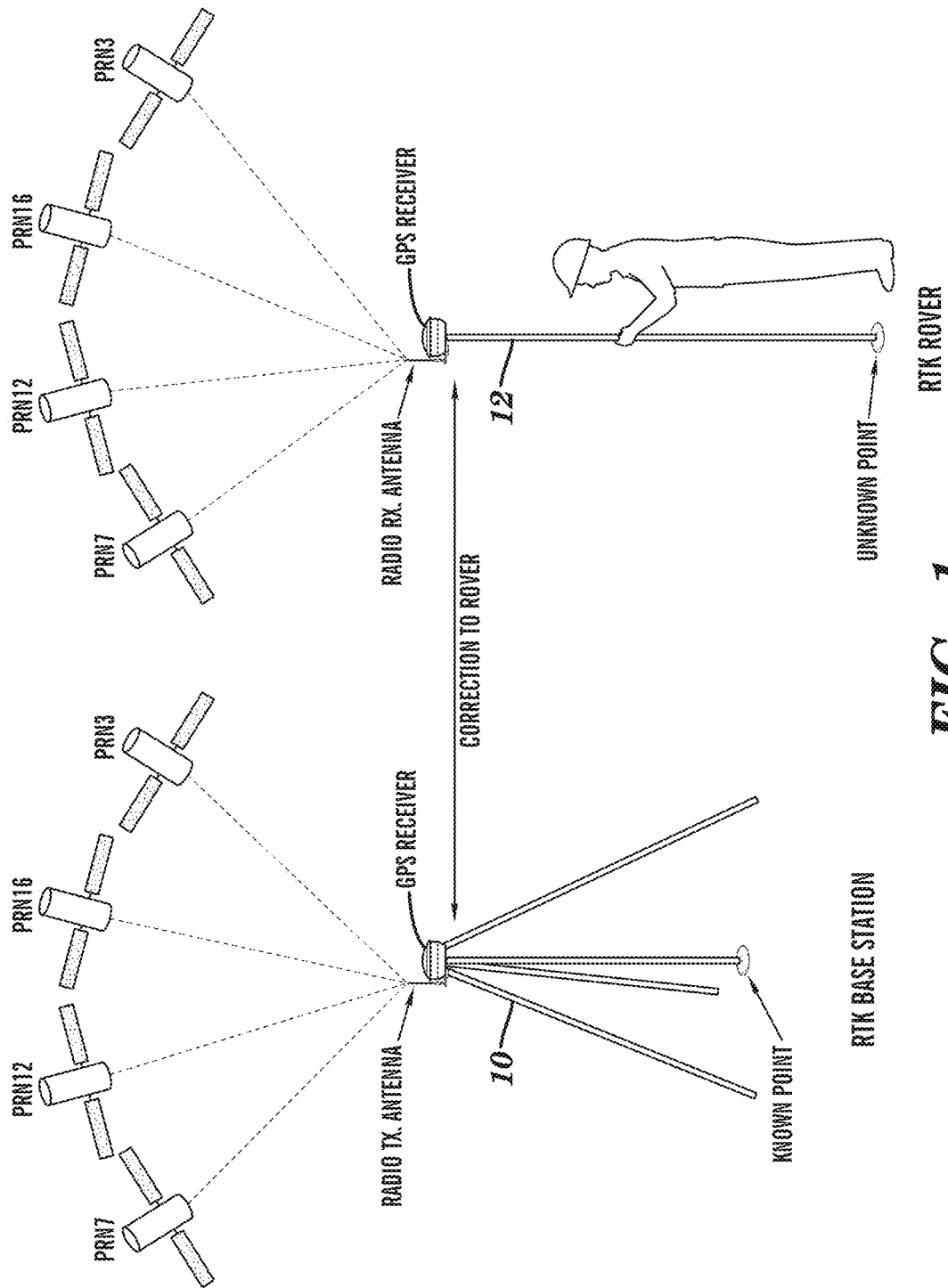
FIG. 1 is a schematic view of a GNSS Real Time Kinetic data collection system of the prior art.

Referring now to the figures, embodiments of the present invention will be more thoroughly described. GNSS is used to survey new points (gathering data for topographical maps and as-built maps) and for staking out known or computed points (typically for construction but also for property corners). Those skilled in the art will recognize that as used herein, a "point" refers to a particular location specified in two or three dimensions, such as along X, Y and Z axes in a Cartesian coordinate system. These operations may be accomplished using the RTK approach discussed hereinabove with respect to FIG. 1.

Figure 4:
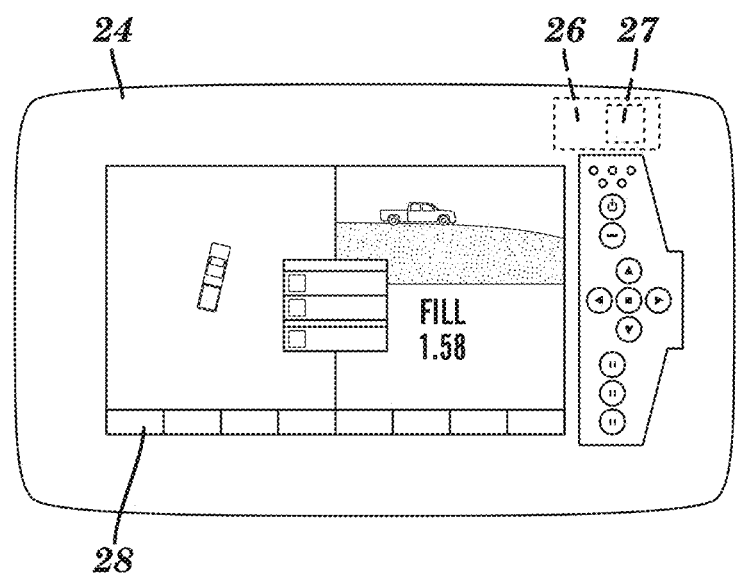
FIG. 4 is an elevational view of another element of an embodiment of the present invention.

Turning to FIGS. 3-5, particular embodiments of the present invention include a GNSS surveying receiver 20, such as the BRx5 or BRx6 Mobile Base Station (FIGS. 3&5) available from Carlson Software, Inc. of Maysville, Ky., USA ("Carlson"), which has been modified in accordance with the teachings hereof to include multiple GNSS receivers and RTK engines, as described herein. As shown, GNSS surveying receiver 20 includes first and second GNSS receivers 19 and 21 which respectively implement first and second RTK engines 23 and 25. It should be recognized that in particular embodiments, GNSS receivers 19 and 21, and RTK engines 23 and 25 (and 23' and 25') are conventional devices, such as of the type commonly found in the aforementioned BRx5 or BRx6 Mobile Base Station, which are modified in accordance with the teachings hereof. As also shown, GNSS surveying receiver 20 is mounted on top of a range pole 22 (FIGS. 3&5). These embodiments also include a data collector 24 (FIG. 4) in the form of a handheld computer such as the Carlson Supervisor™ Rugged Tablet PC, running surveying data collection software (data collection module) 26 such as SurvCE®, both of which are available from Carlson.

The first GNSS receiver 19 includes a first CPU and memory (302, 304, FIG. 12), and implements at least one first RTK engine 23. In particular embodiments, GNSS receiver 19 implements one or more additional first RTK engines on the same (i.e., being co-located with) first CPU and memory, such as shown at 23'.

The second GNSS receiver 21 includes a second CPU and memory (302, 304, FIG. 12) and implements at least one second RTK engine 25 (and optionally, one or more additional second RTK engines 25' using the same (i.e., being co-located with) second CPU and memory). Optionally, the second GNSS receiver 21 uses hardware and/or firmware configurations that are distinct from those of the first GNSS receiver 19.

In addition, all of the RTK engines use a set of parameters selected from the following group of: a parameter specifying a maximum number of satellites to use in determining position; a conventional fading factor; a conventional residual ionospheric delay estimator; whether to handle a measurement as an anomalous measurement; and combinations thereof. It is noted that in particular embodiments, the particular set of parameters selected for the first RTK engine(s) 23, 23' is the same set of parameters selected for the second RTK engine(s) 25, 25'.

The first RTK engine(s) 23, 23' is configured to receive a first plurality of GNSS signals from multiple satellites, while also receiving a first correction signal from at least one base receiver. The first RTK engine(s) 23, 23' is configured to then determine first 3D point position data for the first GNSS receiver 19 based on the first plurality of GNSS signals and the first correction signal. The second RTK engine(s) 25, 25', is configured to receive a second plurality of GNSS signals from the multiple satellites, while also receiving a second correction signal from at least one base receiver. The second RTK engine(s) 25, 25' is configured to then determine second 3D point position data for the second GNSS receiver 21 based on the second plurality of GNSS signals and the second correction signal. It should be noted that embodiments of the present invention may use signals from satellites of any one or more satellite systems (e.g., GPS, GLONASS, Galileo, BeiDou). For example, although in particular embodiments the first and second RTK engine(s) receive GNSS signals from the same set of satellites, in other embodiments, the first and second RTK engine(s) may receive GNSS signals from satellites of mutually distinct satellite systems.

In particular embodiments, the first and second RTK engine(s) respectively determine the first and second 3D point position data using mutually distinct algorithms. In addition, in particular embodiments, the first and second correction signals correspond to mutually distinct positions, and/or to mutually distinct base receivers, and/or to mutually distinct correction protocols. For example, these embodiments may use correction signals from mutually distinct VRS nodes, and/or may use correction signals from mutually distinct VRS suppliers that may send their correction signals using different VRS protocols. Examples of VRS suppliers and VRS protocols that may be used with embodiments of the present invention include RTCM, CMR, NTRIP, CORS, etc. These different protocols are essentially different formats for sending the desired information. In general, newer versions (of the same protocol) may send more information (and additional parameters) than previous versions, so these differences may be used by the instant embodiments to help address correlation issues, as will be discussed in greater detail hereinbelow.

It should be noted that various embodiments of the present invention use a single first RTK engine 23 and a single second RTK engine 25, to respectively generate the first and second 3D point position data simultaneously. Alternate versions of these embodiments use at least three RTK engines 23, 23', 25, 25', all configured to generate the first and second 3D point position data substantially simultaneously. Embodiments may use, for example, two first RTK engines 23, 23' and a second RTK engine 25, in combination. Alternate embodiments may use a single first RTK engine 23 and two second RTK engines 25, 25', all in combination. Additional RTK engines 23' or 25' may also be used, all in combination, as may be desired to further enhance the accuracy of the resulting 3D point position data in some applications, as will be apparent in light of the discussion herein, particularly with respect to FIGS. 18-22.

Embodiments of the present invention also include an analysis tool running in the data collector 24 and/or in the receiver as shown at 29. Analysis tool 29 is configured to adjust the first and second 3D point position data using a least square method, and to also complete a blunder detection test, to produce corrected first and second 3D point position data. In particular embodiments, the analysis tool is executed for every epoch (e.g., for every collected 3D position point in the first and second 3D point position data) as it is collected from all the RTK engines simultaneously. The analysis tool thus provides a quality check and verification of the collected 3D positions in real-time. It should be recognized, however, that the analysis tool may be executed less frequently, e.g., on batches of epochs, without departing from the scope of the present invention.

Examples of blunder detection tests usable by embodiments of the present invention include a conventional chi-square test and/or a conventional Fisher F-test. Other blunder detection tests that may be useful for particular applications include the multiple (students) t-test which is a special case of F-test. The multiple t-test is essentially the same as using an F-test with 1 degree of freedom in the numerator. The student t-test is often used when evaluating potential blunders in height (z) dimension (because only one parameter is tested). When evaluating groundplane, two parameters are tested (x and y), with F-test being used due to having two degrees of freedom. Those skilled in the art, will recognize, in light of the teachings hereof, that a reason for using t-test over F-test (with 1 degree of freedom) is that the density function for student t-distribution is easier to integrate. The skilled artisans will also recognize that another option is to test observations for blunders by using chi-square 3 degrees of freedom, or F-test 3 degrees of freedom, in the numerator while rejecting whole observation (x, y and z) from a particular engine.

In particular embodiments, the analysis tool 29 is also configured to aggregate the corrected first and second 3D point position data, to identify any 3D points in the aggregated data that are located closer than a predetermined threshold to one another, and to designate the identified 3D points as the 3D location of the GNSS surveying receiver in real-time.

It should be recognized that the foregoing embodiments provide for real-time position detection (i.e., without the need for temporally spaced measurements), using two or more RTK engines, in which at least two of the RTK engines run on mutually distinct hardware and memory (302, 304), while using the same set of parameters. In particular embodiments, the RTK engines running on mutually distinct hardware and memory also use mutually distinct hardware and/or firmware configurations. In various embodiments the RTK engines may also use mutually distinct algorithms to determine position.

Particular embodiments also use selections of various settings. For example, in various embodiments the first RTK engine(s) 23, 23' use a first setting group, selected from the group consisting of a selection of "static" versus "kinetic" position modes, and correction signal protocols. These embodiments are also configured to implement the second RTK engine(s) 25, 25' using a second setting group, selected from the group consisting of a selection of "static" versus "kinetic" position modes, and correction signal protocols. It is noted, however, that in particular applications, it is desirable for the selected first and second setting groups to be mutually distinct.

It should be noted that an aspect of the present invention was the recognition by the present inventor(s) that correlation errors are often present when doing GNSS measurements with conventional equipment. While not wishing to be tied to a particular theory, in many situations these errors may be caused by atmospheric disturbances such as ionospheric and tropospheric refraction, and errors in the satellite paths (i.e., 'multipath' errors) due to satellite signals reflecting off of topographic features such as buildings, (walls, roofs, etc.), and plane surfaces such as lakes, etc., at the location being measured. These conditions may produce measurements that are not independent (i.e., the measurements are correlated), and thus generate incorrect position data.

The present inventor further recognized that there is a significant difference between correlated measurement errors and correlated false fixes. While correlated measurement errors may be incorrect, they are often in the vicinity of the correct position. Correlated false fixes, on the other hand, may be much further, e.g., several meters, away. The various embodiments shown and described herein are configured to address both of these RTK measurement issues. The inventor's use of multiple RTK engines running on mutually distinct GNSS receivers (the "multi-unit" approach) is intended to be particularly effective at addressing the issue of correlated false fixes, while the claimed analysis tool is intended to effectively address the above-described correlated measurement errors. Correlated measurement errors and correlated false fixes are collectively referred to herein as 'correlation errors' and/or 'correlation problems'.

One technique used to try to avoid correlation problems, especially correlated false fixes, is to provide for time-delay between measurements, i.e., to temporally space the measurements. The instant inventor has discovered, for example, that allowing at least 3,600 seconds (1 hour) between GNSS measurements routinely reduces correlated false fixes to levels that are negligible, i.e., provides levels of uncorrelated measurements suitable for accurate position measurement in a majority of applications. Unfortunately, temporally spacing each measurement is impractical, especially on relatively large sites, where even relatively short periods of waiting between measurements adds up quickly.

The embodiments shown and described herein are provided to reduce the instances of correlation errors, especially correlated false fixes, in order to obtain relatively high quality position coordinates in real-time, i.e., without the need for temporally spaced measurements. While not wishing to be tied to any particular theory, the inventor has recognized that multiple RTK engines running on the same hardware/CPU tend to be susceptible to correlation errors, especially correlated false fixes. These issues are addressed by the "multi-unit" approach shown and described herein, namely, the use of multiple RTK engines running on mutually distinct hardware/firmware, and which may optionally use mutually distinct algorithms and/or distinct hardware/firmware settings.

Turning now to FIGS. 18-22, test results demonstrating efficacy of the claimed invention are shown graphically, and described. Three RTK engines each running on separate CPUs were configured to share a common GNSS antenna, and each logged 225,000 measurements at the same measurement location. This measurement location was one having topographic features known to generate correlation errors due to multipath conditions, etc., as described hereinabove. The RTK engines/CPUs were respectively: a Spectra Geospatial SP80 GNSS Receiver ('SP80') commercially available from Spectra Geospatial, Westminster Colo.; a first Carlson BRx6 GNSS Receiver ('BRx6-A') available from Carlson Software, Inc., Maysville, Ky.; and a second Carlson BRx6 GNSS Receiver ('BRx6-B').

As respectively shown in FIGS. 18-20, it can be seen that the majority of the 3D point position data generated by each of the RTK engines is clustered within a radius of 10 cm from the actual location of each RTK engine. However, a significant number of the 3D point position data points are beyond a 20 cm radius of the actual location, ostensibly due to the aforementioned correlation errors. Discrepancies of 10 cm or less are deemed acceptable for many applications, while discrepancies of 20 cm or more are often deemed unacceptable.

Turning now to FIG. 21, the 3D point position data generated by RTK engines 1 and 2 as described above are displayed collectively on the left side of the figure. As this 3D point position data is generated, it is run through the analysis tool as described hereinabove to produce corrected first (from RTK engine 1) and second (from RTK engine 2) 3D point position data in real-time. The corrected first and second 3D point position data is then aggregated to identify the 3D points therein that are located closer than a predetermined threshold to one another, which are then designated as the 3D location of the GNSS surveying receiver in real-time. These designated 3D location data (the 'results'), as generated over the course of testing are shown graphically on the right side of FIG. 21. As shown, these results are all within a radius of about 12 cm, and are thus free from the aforementioned correlation errors shown in FIGS. 18, 19, and on the left side of FIG. 21. These results may therefore be deemed sufficiently accurate for a majority of applications. It is also noted that these results are generated in real-time, to obviate any need to temporally space the collection of data at particular 3D point positions.

Referring now to FIG. 22, the approach shown and described with respect to FIG. 21 is repeated with 3D point position data from all three RTK engines (RTK engines 1, 2 and 3). In this example, the 3D point position data generated by RTK engines 1, 2 and 3 as described above are displayed collectively on the left side of the figure. As this 3D point position data is generated, it is run through the analysis tool as described above to produce corrected first (from RTK engine 1), second (from RTK engine 2), and third (from RTK engine 3) 3D point position data in real-time. The corrected first, second, and third 3D point position data is then aggregated to identify the 3D points therein that are located closer than a predetermined threshold to one another, which are then designated as the 3D location of the GNSS surveying receiver in real-time. These designated 3D location data (the 'results') are shown graphically on the right side of FIG. 22. As shown, these results are all within a radius of about 10 cm, and are thus free of the aforementioned correlation errors shown in FIGS. 18, 19, 20, and on the left side of FIG. 22. These results may therefore be deemed sufficiently accurate for a majority of applications. Moreover, these results are generated in real-time, to obviate any need to temporally space the collection of data at particular 3D point positions. Still further, although in this example the third RTK engine (RTK engine 3) runs on its own hardware/CPU and firmware, in particular embodiments, RTK engine 3 may be co-located on the same hardware/CPU and firmware as RTK engine 1 or RTK engine 2, without departing from the scope of the present invention.

Figure 6A:
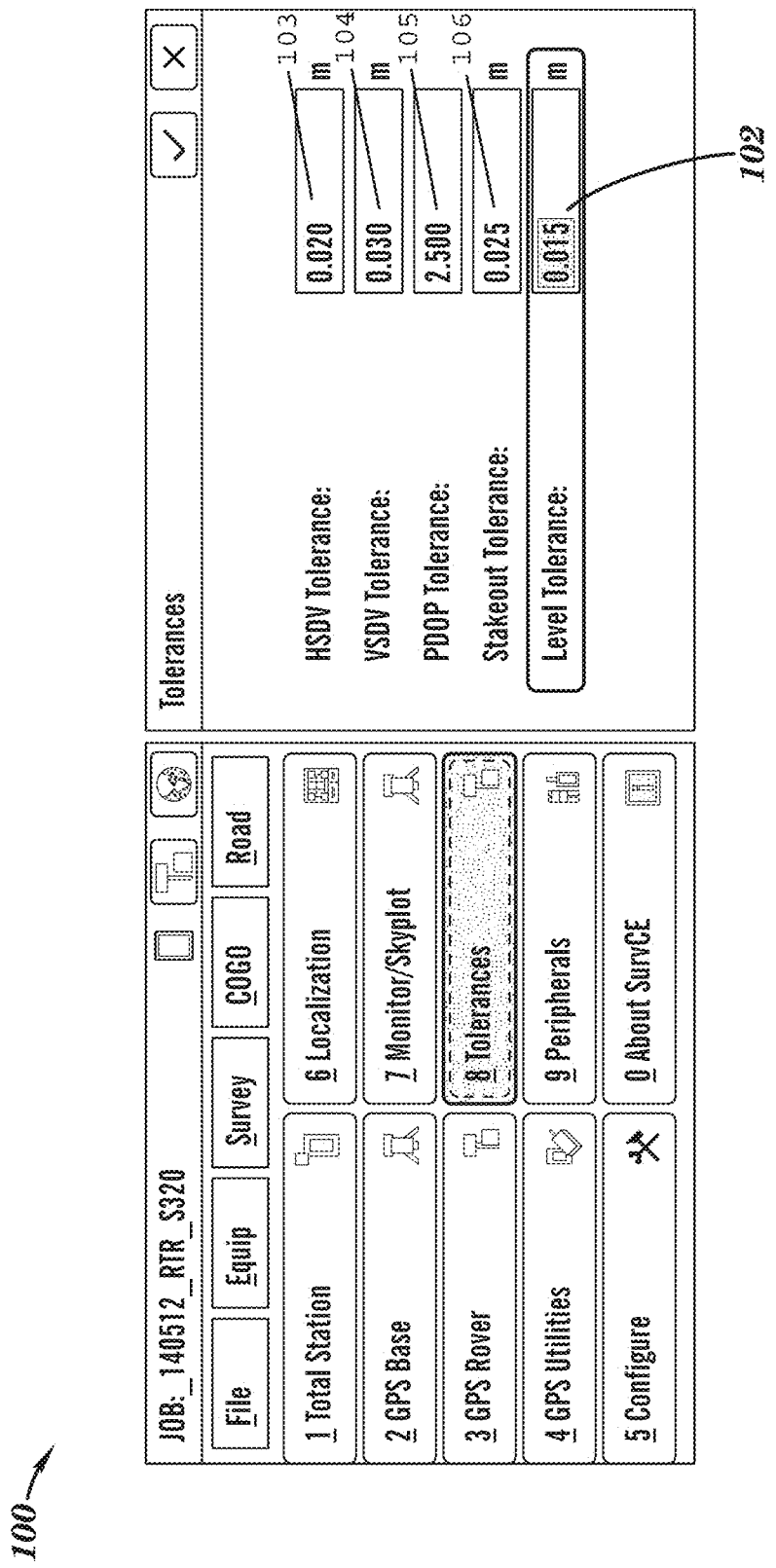
FIG. 6A is a view of a graphical user interface display of an embodiment of the present invention.
Figure 6B:
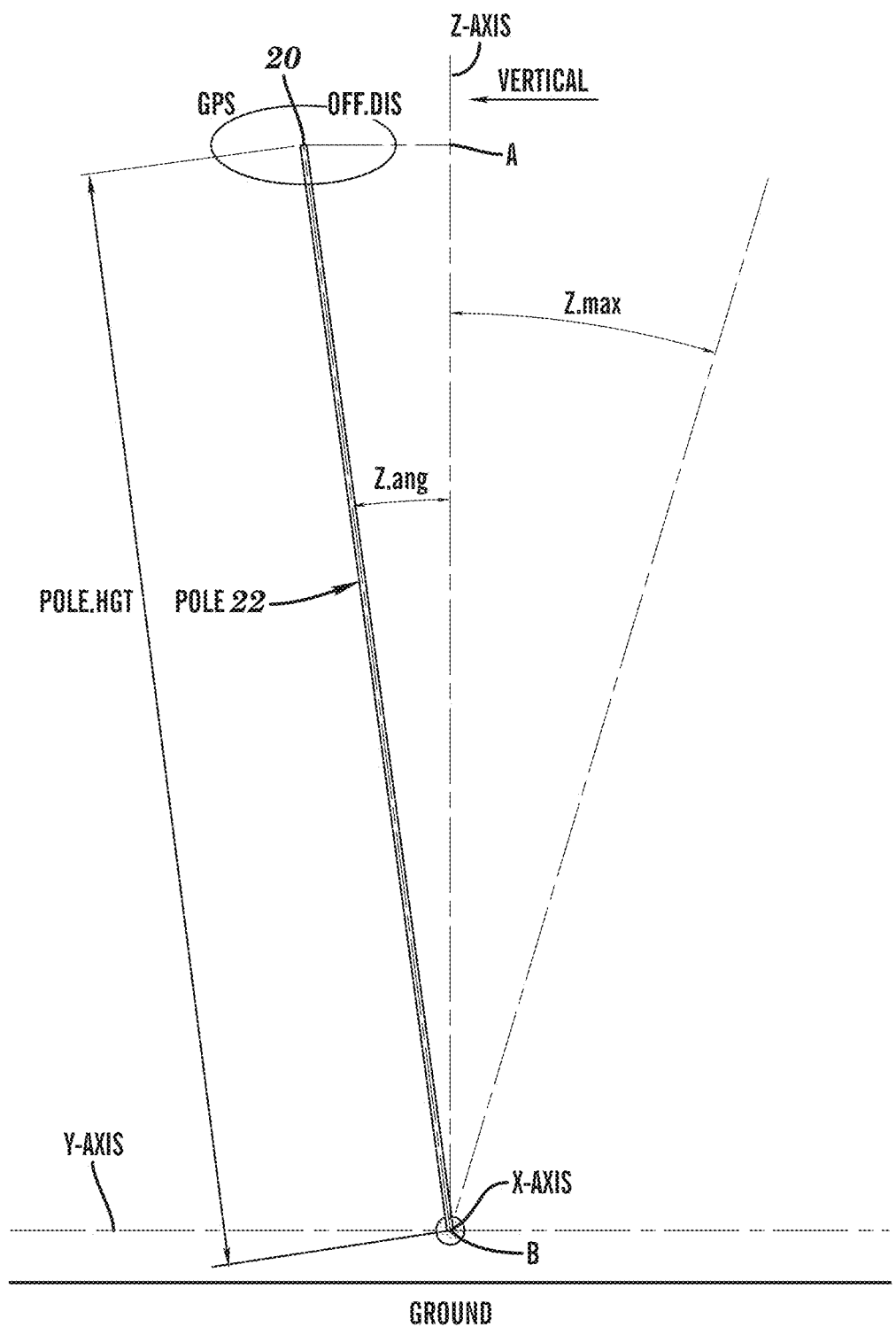
FIG. 6B is a schematic elevational view of an embodiment of the present invention with coordinate axes.
Figure 6C:
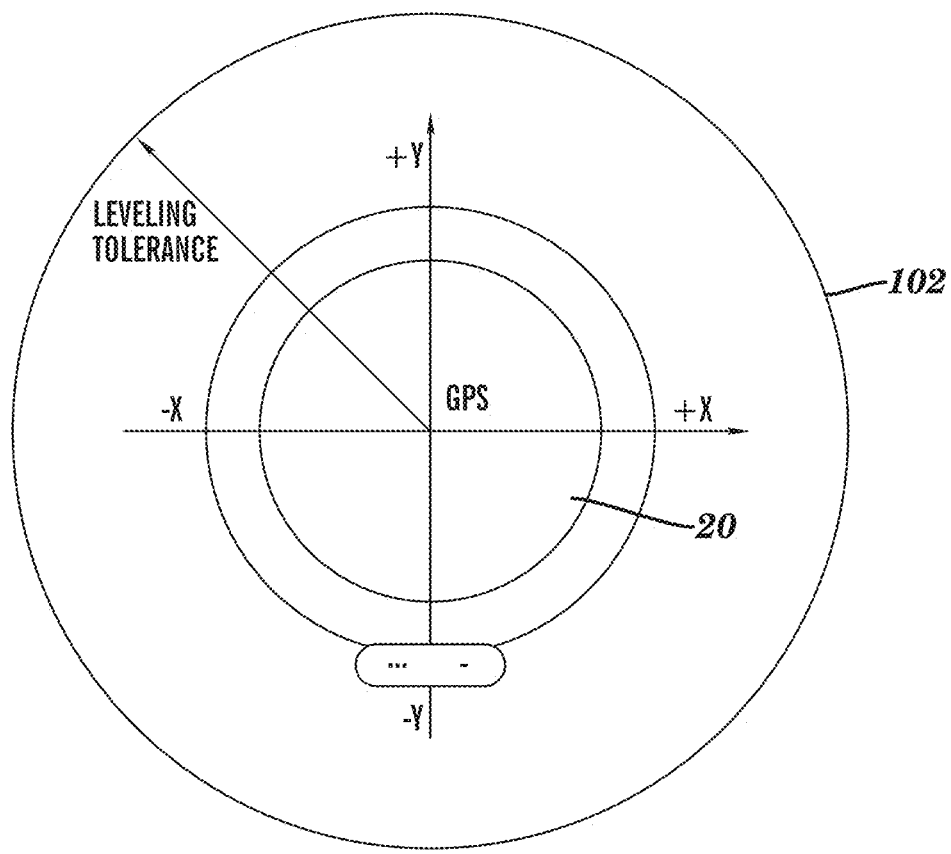
FIG. 6C is schematic plan view of an embodiment of the present invention with coordinate axes.

In particular embodiments, the receiver 20 includes integral electronic tilt sensors, which provide a reading of the tilt on the instrument on two axes, (left-right, and forward-back, sometimes called pitch and yaw, or simply tilt along the x and y axes as shown in FIG. 6C). Examples of such tilt sensors include the CarlsonDual Axis/Angular Sensor, available from Carlson. The instrument 20 transmits these x-y tilt readings to the data collector (e.g., handheld computer) 24. The data collector receives the tilt readings, along with the positional data (latitude, longitude, elevation, etc.) from the GNSS receiver 20. The data collection module 26 (e.g., SurvCE software) uses these x-y tilt measurements along with the length of the range pole 22 (e.g., the pole height as shown in FIG. 6B) to calculate the horizontal distance by which the receiver 20 is out of level. It should be recognized that in particular embodiments, module 26 does not merely calculate and display the x-y tilt measurements as angular values, i.e., as the angular degree of tilt (z angle, FIG. 6B) along the x and y axes relative to vertical. Rather, module 26 uses the captured tilt data, along with the length of the pole 22 supporting the receiver 20, to calculate the horizontal distance and direction of movement required to level the GNSS receiver 20. These values are displayed to the user on GUI 28, e.g., graphically, in the form of the e-bubble level of FIGS. 7-9, and/or numerically, by virtual level component 27 (e.g., of the SurvCE software). This distance information may also be stored with captured raw data, e.g., in memory 304/306 (FIG. 12) of data collector 24, for Quality Control/Quality Assurance or post-processing.

In particular embodiments, the formula shown in the following pseudo code I is used to calculate the horizontal distance from level, and whether the range pole/tilt bubble is within tolerance:

---
Pseudo Code I
---
input:
Current Xtilt: xtilt
Current Ytilt: ytilt
User configured tolerance in meters: tol;
RodHeight: rh
Pseudo Code:
incline = sqrt(xtilt*xtilt+ytilt*ytilt);
distancefromlevel = rh * sin(incline);
if(distancefromlevel > tol) then do not allow the reading to be stored.

---

This approach makes the e-bubble more useful in the field than conventional approaches that either fail to quantify the extent to which the device is out of level, or simply provide angle (inclination) information rather than horizontal distance information. This has a number of potential advantages:

Tolerance based on horizontal distance from the level (vertical) position, rather than simply angle measurements, enables compensation for different length poles, to provide greater accuracy than prior analog approaches that do not compensate for pole length.

The operator only has to look at the data collector for both data collection and leveling functions, rather than repeatedly looking back and forth between a data collector and a pole-mounted bubble level.

The data collection module may calculate/correct accurate position data when the range pole is not exactly vertical.

Provides for an Auto-by-Interval feature, in which data may be automatically captured once the range pole is within level tolerance, e.g., after a predetermined distance or time interval. This should improve surveyor productivity and/or safety, by permitting users to watch their surroundings, e.g., oncoming traffic when surveying roadways, etc., rather than looking at a pole-mounted level. Moreover, an enhanced version of the Auto-by-Interval (Auto-Store) feature facilitates automatic data capture without any button presses by automatically reducing the incidence clustered data capture, i.e., unwanted data captures clustered around a particular location.

Provides for use of audible signals, such as beeps than change frequency as the pole approaches level (similar to a Geiger counter or metal detector).

Provides for setting a maximum allowable tolerance for the distance the receiver is out of vertical and will signal the user and/or refuse to store points if the instrument is beyond the tolerance. This tends to improve the quality of data collected.

The GUI provides an uncluttered, easy to read analog-style interface along with level tolerance information, with tolerance in the form of distance from level rather than angles, to permit auto-by-interval surveying and improved accuracy of survey data collection. A pre-programmed calibration routine also compensates for vibrations and other aberrations.

Turning now to FIGS. 6-11, various aspects of the bubble level display are shown and described in greater detail. As shown in FIG. 6A, GUI 28 includes a new and easy to use Leveling Tolerance Management screen 100, which displays tolerances 102 in linear units (meters or feet). Tolerance 102 represents the maximum horizontal deviation of the GNSS 20 from the vertical (level) position, taking into consideration the position of the Antenna Phase center (which is dependent on the current pole height and antenna L1 offset). Those skilled in the art will recognize that the Antenna Phase center will be offset from the top of the pole to an extent that will vary, in part, depending on the particular make and model of GNSS 20. Therefore, for ease of explication, the discussion herein will assume that the Antenna Phase center is located in the GNSS at the top of the range pole 22, with the understanding that measurements involving the pole length (height) are intended to encompass the pole height plus the actual antenna L1 offset. Tolerances for other GPS variables such as HSDV (Horizontal Standard Deviation), VSDV (Vertical Standard Deviation), PDOP (Position Dilution of Precision, i.e., amount of error), and Stakeout Tolerance, may also be entered as shown at 103, 104, 105 and 106, respectively. Moreover, those skilled in the art will recognize that in particular embodiments, HRMS (Horizontal Root Mean Square) and VRMS (Vertical Root Mean Square) may be used in lieu of HSDV and VSDV, respectively.

Figure 9:
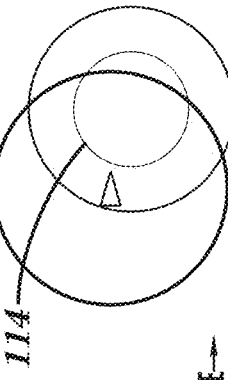
FIG. 9 is a view of a display of a graphical user interface of an embodiment of the present invention.
Figure 8:
FIG. 8 is a view of a display of a graphical user interface of an embodiment of the present invention.
Figure 7:
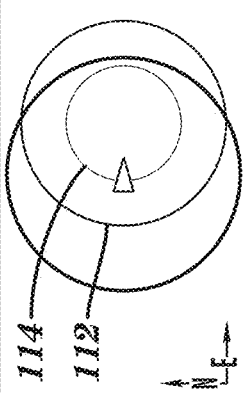
FIG. 7 is a view of a display of a graphical user interface of an embodiment of the present invention.
Figure 11:
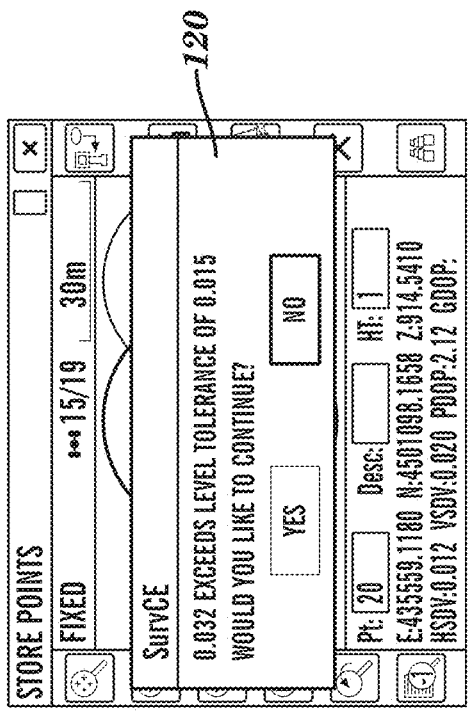
FIG. 11 is a view of a display of a graphical user interface of an embodiment of the present invention.

The linear level tolerance is shown relative to the GNSS 20 at 102 of FIG. 6C. And as shown in FIG. 6B, in accordance with the pseudo code shown above, the entered level tolerance 102 (FIG. 6A), along with the length (pole height) of the range pole 22, corresponds to a maximum angular inclination value (z max). In particular embodiments, inclinations of the range pole (z angle) beyond z max/tolerance 102 will generate a warning such as shown in FIG. 11. Turning now to FIGS. 7-9, GUI 28 includes an Accurate Electronic Leveling Device (Leveling Viewer) which in some respects, emulates conventional spherical-glass bubble levels used on range poles, by providing a:

Leveling viewer (fixed black circle) 110; and

A Tolerance e-Bubble (small moving green/red circle) 114 to advise the user when the verticality requested is acquired before storing the new point.

And, unlike a conventional bubble level, the Leveling Viewer also includes a High-Precision e-Bubble (blue moving circle) 112 for fine leveling adjustment.

Operation of these features, including "Best Leveling", "In Tolerance" and "Out of Tolerance" conditions, are shown in FIGS. 7, 8 and 9, respectively. In FIG. 7, the Blue High-Precision e-bubble 112 shows the best concentric match possible within the Leveling Viewer. In FIG. 8, the Tolerance bubble 114 shows Green and is fully inside the Leveling viewer, to indicate that while the pole 22 is not in optimal position, it is still within tolerance and therefore acceptable for data collection. In FIG. 9, the Tolerance bubble 114 is Red and extends at least partially outside the Leveling viewer, indicating that data should not be collected.

Figure 10:
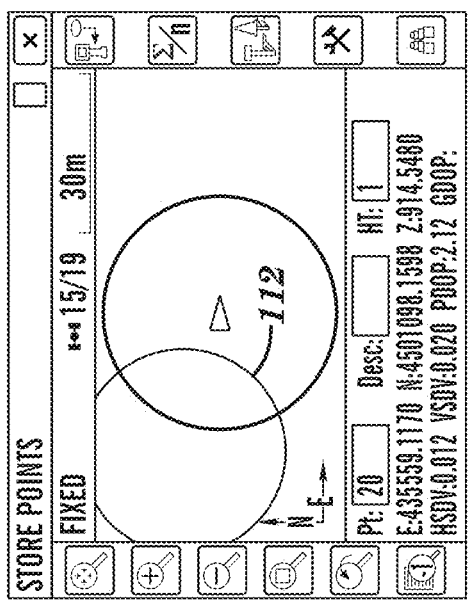
FIG. 10 is a view of a display of a graphical user interface of an embodiment of the present invention.

Turning now to FIG. 10, in particular embodiments, GUI 28 includes Auto-Adaptable Leveling Sensibility, in which the in-graphics relation of pixel/resolution to tilt-angle changes depending on: Current user-defined Leveling Tolerance; Current user-defined Antenna height (L1 offset automatically included); and On screen Graphics size and resolution. This means that the lower the tolerance setting, the higher the sensitivity perceived by the user. It should be recognized that the same tolerance setting makes leveling more sensitive when using higher poles 22, in order to preserve the Maximum Linear Deviation (millimeter or inches) set by the user. During use of the leveling function, whenever the pole 22 is tilted too much, the user may be advised by: the Tolerance Bubble not showing, and/or the Hi-Precision Bubble 112 getting "locked" at the maximum deviation, while remaining visible on the screen and located on the screen in the direction of tilt of the pole, so the user can easily identify the direction of movement required to bring the pole back into the vertical position.

As shown in FIG. 11, various embodiments may include a Leveling Tolerance Check screen 120 implemented in Store Points and Stakeout modes of operation. Similar to the "Stakeout Tolerance Check", the software will warn the user and wait for his validation before storing a point when the current tilt of the pole exceeds the tolerance set by the user. Exemplary applications for these embodiments may include:

Gathering Data/Surveying (1) The user sets a tolerance 102 (FIG. 6A) for the level bubble (e.g., 2 centimeters) and then stores only when the bubble is within tolerance. If the green circle 114 is inside the larger circle (leveling viewer 110), the system is within tolerance. (Note that the outer black circle 110 is the same size no matter how close we are zoomed in or how far we are zoomed out—we could be seeing a screen of 8'×10' or 80'×100', this GUI screen still operates similarly.)

(2) In the command Auto-by-Interval, data may be automatically captured at a 10 meter horizontal interval distance or by time (e.g., every 5 seconds). In particular embodiments, the system will automatically prevent data from being captured at the desired interval if the GNSS 20/range pole 22 is tilted beyond tolerance 102. No button pressing is required, just auto-detection of the system being within tolerance 102. Optionally, a Geiger counter-like audio clicking or other varying frequency may be used to guide the user to the level condition (beeps faster if more level, then goes single tone when level). In this manner, the system provides for "never look down" surveying, e.g., silence until the system has reached moved at least the required interval, then the system beeps with increasing frequency as the pole is leveled, until emitting a steady tone at which time the location data is captured, then the system is moved forward and the process repeated.

It should also be recognized that in particular embodiments, the Auto-by-Interval feature may be optionally configured to permit data capture any time the GNSS is within tolerance 102, e.g., regardless of whether or not a particular distance or time interval as passed. This option provides experienced users with greater flexibility, such as to enable data to be captured based on local topography without being constrained by other intervals. For example, a user could move to the top of a ridge or other topographical feature, and then level the pole to automatically capture data. It should also be recognized that any of these Auto-by-Interval features, whether or not the aforementioned audio feature is used, provides for "never look down" or simply "no distraction" data capture, to advantageously permit users to focus their attention on other matters, such as local vehicular traffic when surveying roadways, etc., for increased user safety relative to conventional approaches which require users to focus on pole-mounted levels during data capture.

(3) Using the inclination (tilt) data, particular embodiments may provide data correction, to enable data collection even when the pole is tilted beyond tolerance. For example, the tilt data may be used in combination with directional data (e.g., provided by an electronic compass or magnetometer), to compute position based on tilt angle and azimuth of the tilt. In this example, a directional sensor in addition to the tilt sensors is used to provide data correction, namely, to enable data collection even when the pole is tilted beyond tolerance. The pseudo code shown above, along with the directional information provided by the electronic compass, may be used to calculate and store the position "A" (FIG. 6B) corresponding to the vertical elevation of GNSS 20 above the bottom B of range pole 22. So while some aspects of the invention include capturing and storing position data when within tolerance, this alternate variation includes capturing and storing position data after adjusting it using the tilt and direction data.

(4) The tilt information may be stored along with the position data, for post-processing and quality control/assurance.

Staking Out (1) When staking out a point list, without touching the keyboard, the user walks to the next point in order, or next closest point, and when the rover detects that it is at that point, it auto-stores once level (i.e., within the level tolerance 102). The user may thus stakeout without touching the keyboard, based on meeting position and level tolerance, i.e., tolerance-based stakeout without button presses.

(2) The above option applies to staking out a single point—move to it, get level, point is measured. No button press. So the key here is staking without touching the data collector—with preset option to store the staked point (also to go into the raw file, confirming tolerance data) or just providing screen notification for hammering the stake into the ground at that point.

Figure 12:
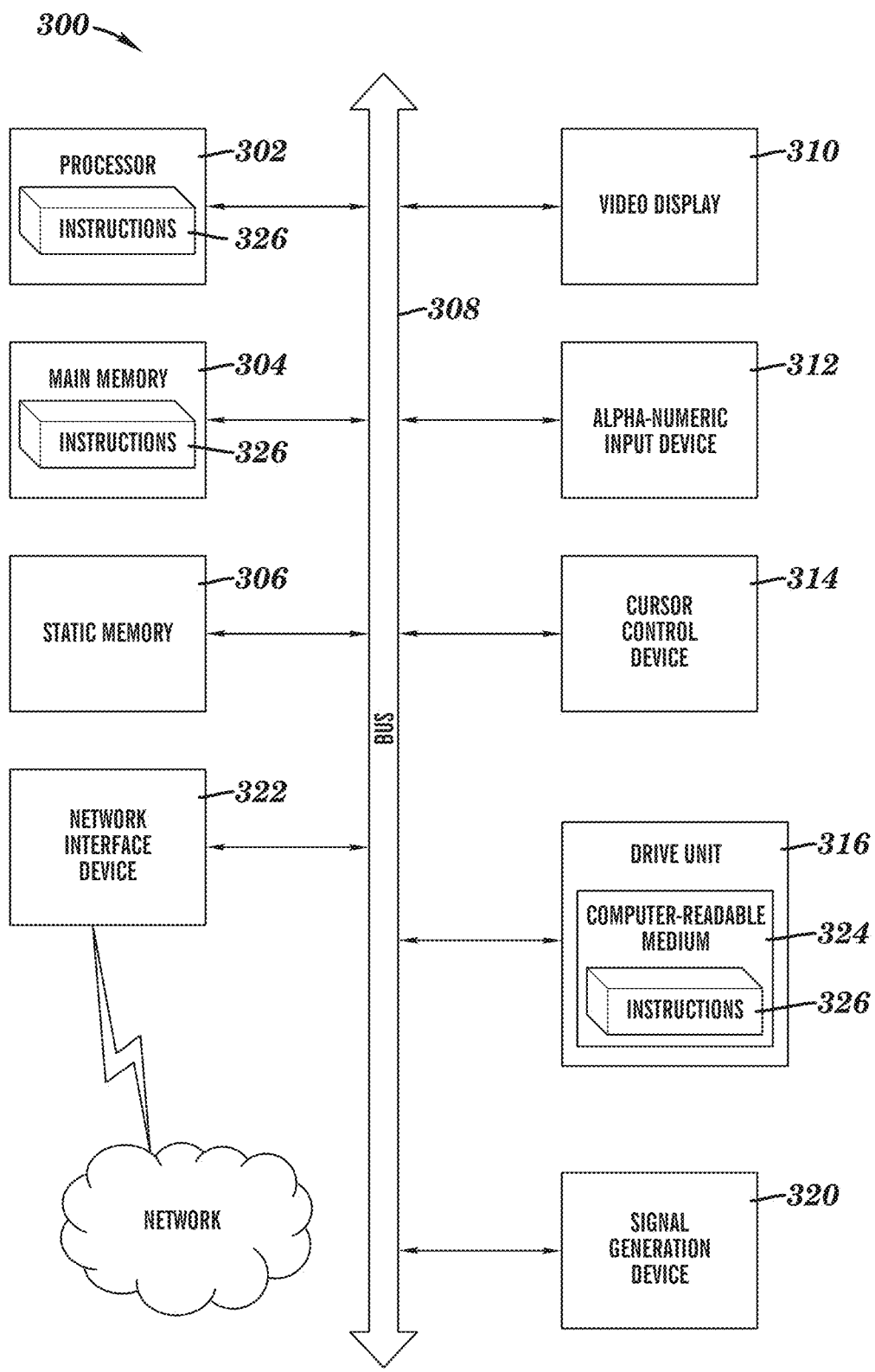
FIG. 12 is a block diagram of one embodiment of a computer system usable with embodiments of the present invention.

FIG. 12 shows a diagrammatic representation of a machine in the exemplary form of a computer system 300 within which a set of instructions, for causing the machine to perform any one of the methodologies discussed above, may be executed. In alternative embodiments, the machine may include a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD), plasma, cathode ray tube (CRT), etc.). The computer system 300 may also include an alpha-numeric input device 312 (e.g., a keyboard or touchscreen), a cursor control device 314 (e.g., a mouse), a drive (e.g., disk, flash memory, etc.,) unit 316, a signal generation device 320 (e.g., a speaker) and a network interface device 322.

The drive unit 316 includes a computer-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "computer-readable medium" shall be taken to include any medium that is capable of storing or encoding a sequence of instructions for execution by the computer and that cause the computer to perform any one of the methodologies of the present invention, and as further described hereinbelow.

Turning now to FIGS. 13-17, additional aspects of the present invention are shown and described. These additional aspects may be used with any of the embodiments disclosed herein. An enhanced Auto-Store feature enables the user to setup the system to automatically store a point each time the system detects that the GPS is level (using the internal tilt sensor) for a specified minimum amount of time. In particular embodiments, this feature requires a minimum distance (also user-selectable) between two consecutive points, to prevent it from storing data points repeatedly once the GPS is level. This minimum distance requirement facilitates the aforementioned buttonless data capture, by avoiding clustered data stores, as described in greater detail hereinbelow. This enhanced Auto-Store feature thus facilitates buttonless data capture, by which the user simply moves from point to point and levels the system to automatically capture and store data without the need to press any buttons.

In particular embodiments, the formula shown in the following pseudo code II is used to calculate the tilt/horizontal distance from level, and whether the range pole/tilt bubble is within the tilt, time and distance tolerances:

Pseudo Code II

```
While(routine is running)
{
    ReadCurrentGPSPosition(X,Y,Z);
    ReadCurrentTiltSensorValue(x_tilt, y_tilt);
    incline = acos(cos(xtilt)*cos(ytilt));
    //If we are out of level, mark the time
    if(incline > tilt_tolerance)
        time_last_out_of_level = current time;
    if((current_time - time_last_out_of_level) > time_tolerance)
    {
        If(distance between current position and last stored
            position) >
distance_tolerance)
        {
            StorePoint( );
        }
    }
}
```

Moreover, various embodiments may also include an accuracy enhancement feature (accuracy module) in which the system captures the aforementioned cluster data, once the predetermined level and time parameters are within tolerance. In other words, the system captures point data during the time that the receiver has been within level tolerance for the minimum period of time, but has not yet reached the distance tolerance and/or minimum distance interval requirement. The system monitors this captured data and once the distance tolerance and/or distance interval has been reached, will store data for the point deemed to be the most accurate, namely, the point data having the smallest incline from vertical (e.g., as determined by the e-bubble level, FIGS. 7-9, and/or by virtual level component 27, FIG. 4). A formula implementing this feature is shown in the following pseudo code III:

Pseudo Code III

```
GPSReading most_level_reading; //this is a struct that contains: lat,
lon, elev, xtilt, ytilt, etc.
    double incline_best_reading = HUGE;
    While(routine is running)
    {
        ReadCurrentGPSPosition(lat, lon, elevation);
        ReadCurrentTiltSensorValue(x_tilt, y_tilt);
        incline = acos(cos(xtilt)*cos(ytilt));
        //If we are out of level, mark the time
        if(incline > tilt_tolerance)
        {
            time_last_out_of_level = current time;
        }
        else
        {
            if(incline < incline_best_reading)
            {
                //Keep track of the best reading during the time that we
are within tolerance
                    incline_best_reading = incline;
                    most_level_reading = current GPS Position;
            }
        }
        if((current_time - time_last_out_of_level) > time_tolerance)
        {
            If(distance between current position and last stored
position) > distance_tolerance)
            {
                StorePoint(most_level_reading); //store the best
reading of the set
            }
        }
    }
```

This enhanced Auto-by-Interval feature thus automatically captures and stores once the range pole is within level, distance and time tolerances. This tends to improve surveyor productivity and/or safety, by permitting users to watch their surroundings, e.g., oncoming traffic when surveying roadways, etc., rather than looking at a pole-mounted level. Moreover, the accuracy enhancement feature provides for relatively high accuracy while maintaining a relatively low processing burden on the system by capturing cluster data and then storing only the most accurate data within the cluster.

Turning now to FIGS. 13-17, various aspects of the enhanced Auto-Store and the enhanced accuracy features are shown and described in greater detail.

As discussed hereinabove with regard to FIG. 6A, the user may actuate the Leveling Tolerance Management screen 100 and enter a desired value for level tolerance 102 (shown in pseudo code I as "tilt_tolerance". As discussed, this level (tilt) tolerance corresponds to the amount of incline that the software will allow before declaring "out of tilt" (FIG. 9), and is expressed in horizontal distance, factoring in the pole height.

Figure 13:
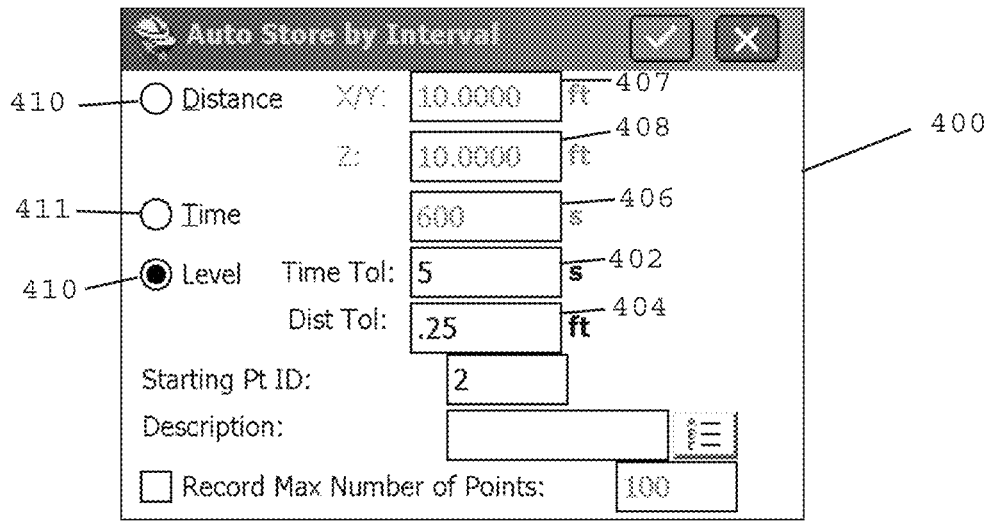
FIG. 13 is a view of a display of a graphical user interface of an embodiment of the present invention.

As shown in FIG. 13, the user may then actuate the Auto Store by Interval screen 400, which includes fields within which the user may enter various Auto Store tolerances. For example, time tolerance ("time_tolerance" in pseudo code II), is entered into time field 402. This is the amount of time which the software will require the receiver to be within the tilt tolerance before automatically storing a point.

The distance tolerance ("dist_tolerance" in pseudo code II) is entered in field 404. This is the minimum distance of movement required between two consecutive stored points. This tolerance prevents multiple points from storing once the device is within the aforementioned level and time tolerances, i.e., to help prevent the system from storing clusters of points when the system is being used in the Auto-Store mode of automatically storing data once the system is leveled. This automatic level functionality may be actuated by the user selecting level button 412 as shown.

As also shown, embodiments of screen 400 include additional fields that may be filled by the user to engage in optional modes of data collection. For example, a minimum elapsed time between stored points may be entered into time field 406, and actuated by user selection of time button 411. The functionality provided by this time field 406 may be used in combination with time tolerance field 402 and distance tolerance field 404 to help further reduce the potential for storing clusters of points in close proximity to one another. Thus, in the example shown in FIG. 13, with a time tolerance of 402 of 5 seconds, and a time field entry 406 of 600 seconds, the user would move to a particular location, level the system and wait 5 seconds for a point to be captured and stored. The system would then wait 600 seconds, during which time the user may move the system to a new location, before leveling and storing the next point.

Still further, embodiments of screen 400 include optional distance fields 407 and 408 into which users may respectively enter horizontal (X/Y) and vertical (Z) distances. These fields represent minimum distances by which the system would need to be moved before storing subsequent points. In the example shown in FIG. 13, with a time tolerance of 402 of 5 seconds, a time field entry 406 of 600 seconds, and distance entries 407 and 408 of 10 feet, the user would move to a particular location, level the system and wait 5 seconds for a point to be captured and stored. The system would then wait for at least 600 seconds, and movement in horizontal and vertical directions of at least 10 feet, before storing the next point. It should be noted that either or both fields 407 and 408 may be used, so that the system may be configured to require horizontal and/or vertical movement. It should also be recognized that when distance fields 407 and/or 408 and distance tolerance field 404 are all actuated, e.g., when the user selects both distance and level buttons 410 and 412, the larger of the entered distances would need to be satisfied before the system would capture subsequent points.

Figure 14:
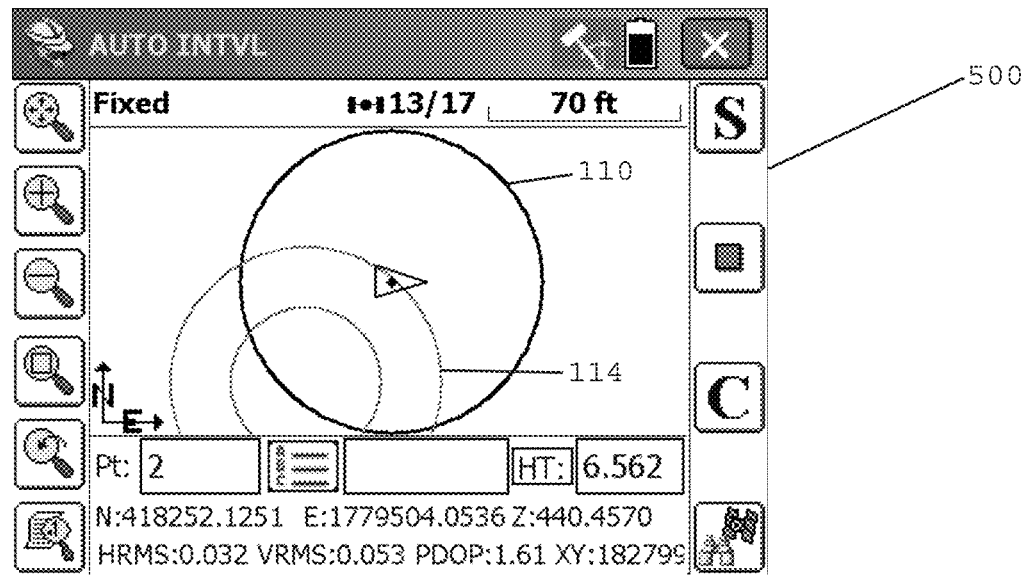
FIG. 14 is a view of a display of a graphical user interface of an embodiment of the present invention.

To describe operation of these enhanced Auto Store and accuracy features in greater detail, once in routine:

1) As shown in FIG. 14, GUI 28 includes an Auto Interval Leveling Viewer 500 which is substantially similar to the Accurate Electronic Leveling Device shown and described hereinabove with respect to FIGS. 7-9, including Leveling viewer (fixed black circle) 110 and e-Bubble (small moving circle) 114. When the e-bubble 114 is Red and extends at least partially outside the Leveling viewer 110, as shown, the system will not store any point data.

Figure 15:
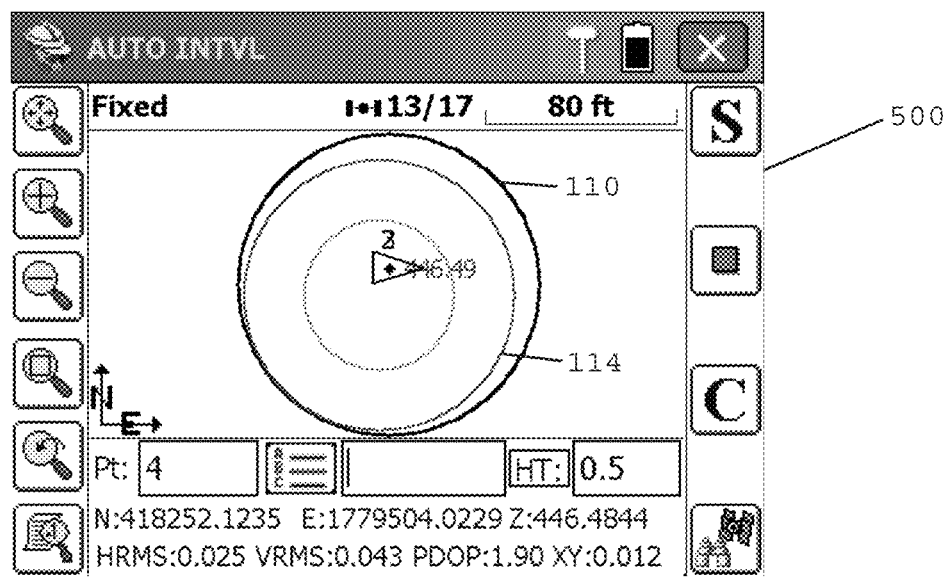
FIG. 15 is a view of a display of a graphical user interface of an embodiment of the present invention.
Figure 16:
FIG. 16 is a view of an embodiment of the present invention during use.
Figure 17:
FIG. 17 is a view of an embodiment of the present invention during use.

2) As shown in FIG. 15, once the Tolerance bubble 114 is fully inside the Leveling viewer, as described hereinabove with respect to FIG. 8, the pole 22 is within level tolerance for data collection. Once this level tolerance has been reached, and the time and/or distance parameters of fields 402, 404, 406, 407 and/or 408 have been met (FIG. 13), a point is stored. Note that in particular embodiments, as described hereinabove, the point stored will not necessarily be the last reading that was taken, but will be the most accurate reading during the time period that the receiver was within level tolerance before the store, as described above with respect to the accuracy enhancement of pseudo code III. Optionally, once a point has been stored, a message may pop up on the Viewer 500, and/or an audible alert may sound, indicating that the user may "put the pole on his shoulder", as shown in FIG. 16, and move to the next location on the site to repeat the process to capture and store a subsequent point. Moreover, as discussed, the Auto Leveling features discussed herein, including the audible alert, enable the user to capture and store data while focusing on the surroundings such as oncoming traffic, as shown in FIG. 17, rather than being compelled to focus on the system screen for each data capture and store.

These embodiments, including the enhanced Auto-Store features, represent a significant departure from conventional surveying instruments by enabling the user to efficiently and accurately capture surveying data without having to repeatedly shift attention to the level or to the system screen. This is a fundamental paradigm shift which enables users to focus on the surroundings, such as oncoming vehicular traffic when surveying roadways, etc.

Furthermore, embodiments of the present invention include a computer program code-based product, which includes a computer readable storage medium having program code stored therein which can be used to instruct a computer to perform any of the functions, methods and/or modules associated with the present invention. The non-transitory computer readable medium includes any of, but not limited to, the following: CD-ROM, DVD, magnetic tape, optical disc, hard drive, floppy disk, ferroelectric memory, flash memory, phase-change memory, ferromagnetic memory, optical storage, charge coupled devices, magnetic or optical cards, smart cards, EEPROM, EPROM, RAM, ROM, DRAM, SRAM, SDRAM, and/or any other appropriate static, dynamic, or volatile memory or data storage devices, but does not include a transitory signal per se.

The above systems are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (e.g., CRT, flat panel LCD, plasma, etc.) and/or hardcopy (i.e., printed) formats. The programming of the present invention may be implemented by one skilled in the art of computer systems and/or software design.

In the preceding specification, the invention has been described with reference to specific exemplary embodiments for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

It should be further understood that any of the features described with respect to one of the embodiments described herein may be similarly applied to any of the other embodiments described herein without departing from the scope of the present invention.

Having thus described the invention, what is claimed is:

1. A computer implemented method for determining a position of a global navigation satellite system (GNSS) surveying receiver based on a plurality of RTK engines, the method comprising:
   disposing within the GNSS surveying receiver, a plurality of GNSS receivers including a first GNSS receiver and a second GNSS receiver;
   with the first GNSS receiver including a first CPU and memory, implementing at least one first RTK engine of the plurality of RTK engines using a set of parameters;
   with the second GNSS receiver including a second CPU and memory distinct from those of said first GNSS receiver, implementing at least one second RTK engine of the plurality of RTK engines using said set of parameters;
   with the at least one first RTK engine, receiving a first plurality of GNSS signals from multiple satellites;
   with the at least one first RTK engine, receiving a first correction signal from at least one base receiver;
   with the at least one first RTK engine, determining first 3D point position data for the first GNSS receiver based on the first plurality of GNSS signals and the first correction signal;
   with the at least one second RTK engine, receiving a second plurality of GNSS signals from the multiple satellites;
   with the at least one second RTK engine, receiving a second correction signal from at least one base receiver;
   with the at least one second RTK engine, determining second 3D point position data for the second GNSS receiver based on the second plurality of GNSS signals and the second correction signal;
   the first and second correction signals corresponding to mutually distinct positions of the at least one base receiver and/or mutually distinct base receivers, and/or mutually distinct correction protocols; and
   configuring the plurality of RTK engines to generate the first and second 3D point position data substantially simultaneously; and
   with an analysis tool:
      producing corrected first and second 3D point position data by adjusting the first and second 3D point position data using a least square method, and completing a blunder detection test on the first and second 3D point position data, the blunder detection test selected from the group consisting of a chi-square test and/or Fisher F-test;
      aggregating the corrected first and second 3D point position data and identifying any 3D points therein that are located closer than a predetermined threshold to one another, and determining from the identified 3D points a 3D location of the GNSS surveying receiver in real-time.

2. The method of claim 1, further comprising configuring the plurality of RTK engines to total at least three RTK engines.

3. The method of claim 1, further comprising:
   implementing the least one first RTK engine of the plurality of RTK engines using a first setting group, the first setting group selected from the group consisting of a selection of "static" or "kinetic" position modes, and correction signal protocols;
   implementing the least one second RTK engine of the plurality of RTK engines using a second setting group, the second setting group selected from the group consisting of a selection of "static" or "kinetic" position modes, and correction signal protocols;
   wherein the first setting group and the second setting group are mutually distinct.

4. The method of claim 1, wherein said set of parameters is selected from the group consisting of a parameter specifying a maximum number of satellites to use in determining position, a fading factor, a residual ionospheric delay estimator, whether to handle a measurement as an anomalous measurement, and combinations thereof.

5. The method of claim 1, further comprising completing said producing corrected first and second 3D point position data, for each epoch of the first and second 3D point position data generated by the plurality of RTK engines.

6. The method of claim 1, further comprising:
   said at least one first RTK engine implementing a first algorithm to determine said first 3D point position data for the first GNSS receiver based on the first plurality of GNSS signals and the first correction signal;
   said at least one second RTK engine implementing a second algorithm to determine said second 3D point position data for the second GNSS receiver based on the second plurality of GNSS signals and the second correction signal; and
   the first and second algorithms being mutually distinct.

7. The method of claim 1, further comprising configuring the second GNSS receiver with hardware and/or firmware configurations distinct from those of said first GNSS receiver.

8. The method of claim 1, further comprising:
   disposing the first GNSS receiver and the second GNSS receiver at the top of a range pole;
   providing a plurality of inclination sensors in operative engagement with the first GNSS receiver and with the second GNSS receiver, the inclination sensors configured to generate inclination data for the range pole along mutually orthogonal x and y axes;
   providing a hand-held data collector computer including a display;
   configuring a data collection module, implemented by the data collector computer, to generate a data collection graphical user interface (GUI) visible on the display;
   communicably coupling the data collector computer to the first GNSS receiver, to the second GNSS receiver, and configuring the data collector to receive from the first GNSS receiver and the second GNSS receiver, the 3D location and the inclination data for the range pole in real-time;
   configuring a virtual level component, implemented by the data collector computer, to use the inclination data to display on the GUI real-time tilt information for the range pole in the form of a virtual bubble level indicator;
   configuring the virtual level component to use the inclination data along with the height of the range pole to calculate and display with the GUI, a horizontal distance and direction to move the top of the range pole to level the GNSS surveying receiver;
   configuring the data collection module to automatically capture the 3D location as the system is moved along a site, when the pole is oriented within a predetermined level tolerance of the horizontal distance from level, to form captured 3D location data corresponding to a plurality of three-dimensional points; and (i) further configuring the data collection module to store at least a portion of the captured 3D location data, wherein the portion of the captured 3D location data corresponds to points captured at predetermined minimum intervals of distance (distance interval) and time (time interval) relative to one another.

9. The method of claim 8, wherein the horizontal distance is calculated using the formula:

$$incline = sqrt(xtilt*xtilt + ytilt*ytilt)$$

where,
xtilt=the inclination data for the range pole along the x axis,
ytilt=the inclination data for the range pole along the y axis, and $$horizontal distance from level = rh*sin(incline)$$

where,
rh=the height of the range pole.

10. The method of claim 8, further comprising configuring the collection module to implement an accuracy module by:
dividing the captured location data into clusters of points (cluster data), wherein each of said clusters includes points separated from one another by less than said time interval; and
ranking the cluster data in each of said clusters for accuracy.

11. The method of claim 10, further comprising configuring the collection module to implement the accuracy module by:
storing a highest ranking point of each of said clusters, wherein each of said clusters includes points separated from a previously stored point by more than said distance interval.

12. The method of claim 11, further comprising configuring the accuracy module to capture and rank the points of each cluster using the algorithm:

```
ReadCurrentGPSPosition(lat, lon, elevation);
ReadCurrentTiltSensorValue(x_tilt, y_tilt);
incline = acos(cos(xtilt)*cos(ytilt));
if(incline > tilt_tolerance);
    time_last_out_of_level = current time;
else
    if(incline < incline_best_reading);
        incline_best_reading = incline;
        most_level_reading = current GPS Position.
```

13. The method of claim 12, further comprising configuring the accuracy module to store a highest ranking point of each of said clusters using the algorithm:

```
if((current_time - time_last_out_of_level) > time_tolerance);
    If(distance between current position and last stored position) > distance_tolerance);
        StorePoint(most_level_reading).
```

14. The method of claim 8, further comprising configuring the data collection module to automatically capture the 3D location data as the GNSS surveying receiver is moved along a site, when the pole has been oriented within the predetermined tolerance of the horizontal distance for a predetermined minimum time tolerance.

15. The method of claim 8, comprising configuring the GUI to display a bubble relative to a circle corresponding to a target position, with the bubble configured to move in real-time as the range pole supporting the GNSS receiver is tilted.

16. The method of claim 15, comprising configuring the GUI to selectively display the bubble inside the circle when the pole is oriented within a predetermined tolerance of the horizontal distance from level, and to display at least a portion of the bubble outside the circle when the pole is oriented outside the predetermined tolerance.

17. The method of claim 16, comprising configuring the bubble to selectively change color when inside and outside the circle.

18. The method of claim 16, comprising configuring the data collection module to permit or refuse capture of the 3D location data when the pole is respectively within or outside the predetermined tolerance.

19. The method of claim 18, comprising configuring the data collection module to automatically capture, without additional user interaction, the 3D location data at predetermined intervals of distance and/or time once the pole is within the predetermined tolerance.

20. The method of claim 8, further comprising configuring an audio component to generate an audible signal configured to guide a user to the predetermined tolerance without requiring the user to view the display.

21. The method of claim 20, comprising configuring the audio component to generate an audible signal that varies in pitch or frequency in accordance with the real-time tilt information.

22. The method of claim 8, comprising configuring the data collection module to use the inclination data and the height of the range pole to adjust the location data to compensate for any inclination of the range pole, to generate corrected 3D location information for the GNSS surveying receiver.

23. The method of claim 22, further comprising disposing at least one directional sensor on the range pole in operative engagement with the first GNSS receiver and with the second GNSS receiver, configuring the directional sensor to generate direction data corresponding to the orientation of the GNSS surveying receiver in a horizontal plane, and configuring the data collector computer to receive from the first GNSS receiver and the second GNSS receiver, the direction data for the GNSS surveying receiver in real-time.

24. The method of claim 23, wherein the directional sensor comprises an electronic compass.

25. The method of claim 23, comprising configuring the data collection module to use the inclination data and the direction data to adjust the location data to compensate for any inclination of the range pole, to generate the corrected 3D location information for the GNSS surveying receiver.

26. The method of claim 25, comprising configuring the data collection module to generate the corrected 3D location information for the GNSS surveying receiver when the pole is tilted outside a predetermined tolerance.

27. The method of claim 8, comprising configuring the data collection module to capture and store the inclination data and location data for post-processing.

28. A global navigation satellite system (GNSS) surveying receiver having a plurality of RTK engines, comprising:
a plurality of GNSS receivers including a first GNSS receiver and a second GNSS receiver;
the first GNSS receiver including a first CPU and memory including computer readable instructions for:

implementing at least one first RTK engine of the plurality of RTK engines using a set of parameters;
receiving a first plurality of GNSS signals from multiple satellites;
receiving a first correction signal from at least one base receiver; and
determining first 3D point position data for the first GNSS receiver based on the first plurality of GNSS signals and the first correction signal;
the second GNSS receiver including a second CPU and memory distinct from those of said first GNSS receiver, the second CPU and memory including computer readable instructions for:
implementing at least one second RTK engine of the plurality of RTK engines using said set of parameters;
receiving a second plurality of GNSS signals from the multiple satellites;
receiving a second correction signal from at least one base receiver; and
determining second 3D point position data for the second GNSS receiver based on the second plurality of GNSS signals and the second correction signal;
wherein the first and second correction signals correspond to mutually distinct positions of the at least one base receiver and/or mutually distinct base receivers, and/or mutually distinct correction protocols;
wherein the plurality of RTK engines are configured to generate the first and second 3D point position data substantially simultaneously; and
an analysis tool having memory with computer readable instructions for:
producing corrected first and second 3D point position data by adjusting the first and second 3D point position data using a least square method, and completing a blunder detection test on the first and second 3D point position data, the blunder detection test selected from the group consisting of a chi-square test and/or Fisher F-test; and
aggregating the corrected first and second 3D point position data and identifying any 3D points therein that are located closer than a predetermined threshold to one another, and determining from the identified 3D points a 3D location of the GNSS surveying receiver in real-time.

29. The system of claim 28, comprising at least three RTK engines.

30. The system of claim 28, further comprising computer readable instructions for:
implementing the least one first RTK engine of the plurality of RTK engines using a first setting group, the first setting group selected from the group consisting of a selection of "static" or "kinetic" position modes, and correction signal protocols;
implementing the least one second RTK engine of the plurality of RTK engines using a second setting group, the second setting group selected from the group consisting of a selection of "static" or "kinetic" position modes, and correction signal protocols;
wherein the first setting group and the second setting group are mutually distinct.

31. The system of claim 28, wherein said set of parameters is selected from the group consisting of a parameter specifying a maximum number of satellites to use in determining position, a fading factor, a residual ionospheric delay estimator, whether to handle a measurement as an anomalous measurement, and combinations thereof.

32. The system of claim 28, wherein the analysis tool is configured for completing said producing corrected first and second 3D point position data, for each epoch of the first and second 3D point position data generated by the plurality of RTK engines.

33. The system of claim 28, further comprising:
said at least one first RTK engine being configured to implement a first algorithm to determine said first 3D point position data for the first GNSS receiver based on the first plurality of GNSS signals and the first correction signal;
said at least one second RTK engine being configured to implement a second algorithm to determine said second 3D point position data for the second GNSS receiver based on the second plurality of GNSS signals and the second correction signal; and
the first and second algorithms being mutually distinct.

34. The system of claim 28, further comprising the second GNSS receiver having hardware and/or firmware configurations distinct from those of said first GNSS receiver.

35. The system of claim 28, further comprising:
at least one GNSS receiver disposed on a range pole, the at least one GNSS receiver configured to generate three-dimensional location data for the GNSS receiver;
a plurality of inclination sensors disposed on the range pole in operative engagement with the GNSS receiver, the inclination sensors configured to generate inclination data for the range pole along mutually orthogonal x and y axes;
a hand-held data collector computer including a display;
a data collection module implemented by the data collector computer, and configured to generate a data collection graphical user interface (GUI) visible on the display;
the data collector computer being communicably coupled to the GNSS receiver and configured to receive from the GNSS receiver, the three-dimensional location data and the inclination data for the range pole in real-time;
a virtual level component implemented by the data collector computer, configured to use the inclination data to display on the GUI real-time tilt information for the range pole in the form of a virtual bubble level indicator;
the virtual level component configured to use the inclination data along with the height of the range pole to calculate and display with the GUI, a horizontal distance and direction to move the top of the range pole to level the GNSS receiver,
the data collection module being configured to automatically capture the location data as the system is moved along a site, when the pole is oriented within a predetermined level tolerance of the horizontal distance from level, the captured location data corresponding to a plurality of three-dimensional points.

36. The system of claim 35, wherein the horizontal distance is calculated using the formula:

$$incline = sqrt(xtilt*xtilt + ytilt*ytilt)$$

where,
xtilt=the inclination data for the range pole along the x axis,
ytilt=the inclination data for the range pole along the y axis, and $$horizontal distance from level = rh*sin(incline)$$

where,
rh=the height of the range pole.

37. The system of claim 35, further comprising the data collection module being configured to store at least a portion of the captured location data, wherein the portion of the captured location data corresponds to points captured at predetermined minimum intervals of distance (distance interval) and time (time interval) relative to one another.

38. The system of claim 35, wherein the collection module is further configured to implement an accuracy module by:
dividing the captured location data into clusters of points (cluster data), wherein each of said clusters includes points separated from one another by less than said time interval; and
ranking the cluster data in each of said clusters for accuracy.

39. The system of claim 38, wherein the collection module is further configured to implement the accuracy module by:
storing a highest ranking point of each of said clusters, wherein each of said clusters includes points separated from a previously stored point by more than said distance interval.

40. The system of claim 39, wherein the accuracy module captures and ranks the points of each cluster using the algorithm:

```
ReadCurrentGPSPosition(lat, lon, elevation);
ReadCurrentTiltSensorValue(x_tilt, y_tilt);
incline = acos(cos(xtilt)*cos(ytilt));
if(incline > tilt_tolerance);
    time_last_out_of_level = current time;
else
    if(incline < incline_best_reading);
        incline_best_reading = incline;
        most_level_reading = current GPS Position.
```

41. The system of claim 40, wherein the accuracy module stores a highest ranking point of each of said clusters using the algorithm:

```
if((current_time – time_last_out_of_level) > time_tolerance);
    If(distance between current position and last stored position) > distance_tolerance);
        StorePoint(most_level_reading).
```

42. The system of claim 35, wherein the data collection module is configured to automatically capture the location data as the system is moved along a site, when the pole has been oriented within the predetermined tolerance of the horizontal distance for a predetermined minimum time tolerance.

43. The system of claim 35, wherein the GUI is configured to display a bubble relative to a circle corresponding to a target position, with the bubble configured to move in real-time as the range pole supporting the GNSS receiver is tilted.

44. The system of claim 43, wherein the GUI is configured to selectively display the bubble inside the circle when the pole is oriented within a predetermined tolerance of the horizontal distance from level, and to display at least a portion of the bubble outside the circle when the pole is oriented outside the predetermined tolerance.

45. The system of claim 44, wherein the bubble selectively changes color when inside and outside the circle.

46. The system of claim 44, wherein the data collection module is configured to permit or refuse capture of the location data when the pole is respectively within or outside the predetermined tolerance.

47. The system of claim 46, wherein the data collection module is configured to automatically capture, without additional user interaction, the location data at predetermined intervals of distance and/or time once the pole is within the predetermined tolerance.

48. The system of claim 35, further comprising an audio component configured to generate an audible signal configured to guide a user to the predetermined tolerance without requiring the user to view the display.

49. The system of claim 48, wherein the audio component is configured to generate an audible signal that varies in pitch or frequency in accordance with the real-time tilt information.

50. The system of claim 35, wherein the data collection module is configured to use the inclination data and the height of the range pole to adjust the location data to compensate for any inclination of the range pole, to generate corrected location information for the GNSS Receiver.

51. The system of claim 50, further comprising at least one directional sensor disposed on the range pole in operative engagement with the GNSS receiver, the directional sensor configured to generate direction data corresponding to the orientation of the GNSS receiver in a horizontal plane, the data collector computer being configured to receive from the GNSS receiver, the direction data for the GNSS receiver in real-time.

52. The system of claim 51, wherein the directional sensor comprises an electronic compass.

53. The system of claim 51, wherein the data collection module is configured to use the inclination data and the direction data to adjust the location data to compensate for any inclination of the range pole, to generate the corrected location information for the GNSS Receiver.

54. The system of claim 53, wherein the data collection module is configured to generate corrected location information for the GNSS receiver when the pole is tilted outside a predetermined tolerance.

55. The system of claim 35, wherein the data collection module is configured to capture and store the inclination data and location data for post-processing.

* * * * *